United States Patent
Kurata et al.

(10) Patent No.: US 9,075,171 B2
(45) Date of Patent: Jul. 7, 2015

(54) SURFACE LIGHT SOURCE DEVICE AND LIQUID CRYSTAL DISPLAY DEVICE

(71) Applicant: OMRON Corporation, Kyoto-shi (JP)

(72) Inventors: Gouo Kurata, Tsurugashima (JP); Masayuki Shinohara, Nagaokakyou (JP)

(73) Assignee: Omron Corporation, Kyoto-shi (JP)

( * ) Notice: Subject to any disclaimer, the term of this patent is extended or adjusted under 35 U.S.C. 154(b) by 132 days.

(21) Appl. No.: 13/775,960

(22) Filed: Feb. 25, 2013

(65) Prior Publication Data

US 2013/0242231 A1    Sep. 19, 2013

(30) Foreign Application Priority Data

Mar. 15, 2012 (JP) ................................. 2012-059419

(51) Int. Cl.
*F21V 7/04* (2006.01)
*G02F 1/1335* (2006.01)
*F21V 8/00* (2006.01)

(52) U.S. Cl.
CPC ............ *G02B 6/0016* (2013.01); *G02B 6/0018* (2013.01); *G02B 6/002* (2013.01); *G02B 6/0038* (2013.01)

(58) Field of Classification Search
CPC .. G02B 6/0015; G02B 6/0016; G02B 6/0018; G02B 6/0013; G02B 6/002; G02B 6/0033; G02B 6/0035; G02B 6/0038
USPC ................. 349/61–62, 65; 362/615, 617, 621
See application file for complete search history.

(56) References Cited

U.S. PATENT DOCUMENTS

| 8,167,474 B2 | 5/2012 | Tanoue et al. |
| 2010/0195019 A1 | 8/2010 | Shinohara et al. |
| 2011/0170036 A1* | 7/2011 | Ishikawa et al. ................ 349/65 |
| 2011/0216267 A1 | 9/2011 | Miyamoto et al. |
| 2011/0286237 A1* | 11/2011 | Tanoue et al. ................. 362/606 |

FOREIGN PATENT DOCUMENTS

| KR | 10-2011-0083490 A | 7/2011 |
| KR | 10-2011-0101050 A | 9/2011 |
| WO | 2008/153024 A1 | 12/2008 |
| WO | 2010/070821 A1 | 6/2010 |

OTHER PUBLICATIONS

Korean Office Action for Application No. 10-2013-0021958 issued Jan. 22, 2014 (4 Pages).

* cited by examiner

*Primary Examiner* — Nathanael R Briggs
(74) *Attorney, Agent, or Firm* — Nutter McClennen & Fish LLP; John J. Penny, Jr.

(57) ABSTRACT

In a surface light source device, a light guide plate includes a light introduction part that traps the light emitted from a point light source and incident from a light incident surface, and a light guide plate body. The light introduction part includes an inclined surface inclined from a surface in a portion having a thickness larger than that of the light guide plate body toward an end of the surface of the light guide plate body. The light guide plate body includes a directivity conversion pattern located between an effective lighting region of the light guide plate body and the light introduction part. The directivity conversion pattern converts a directivity direction of the light from the light introduction part to the effective lighting region such that an angle formed by the directivity direction and a direction perpendicular to the light incident surface decreases when viewed from above.

17 Claims, 36 Drawing Sheets

Prior Art

Prior Art

SURFACE LIGHT SOURCE DEVICE AND LIQUID CRYSTAL DISPLAY DEVICE

Priority is claimed under 35 U.S.C. §119 to Japanese Patent Application No, JP2012-059419 filed on Mar. 15, 2012, which is hereby incorporated by reference in its entirety,

BACKGROUND OF THE INVENTION

1. Technical Field

The present invention relates to a surface light source device and a liquid crystal display device, and specifically to a surface light source device that is used as a backlight for a liquid crystal display, and a liquid crystal display device in which the surface light source device is used.

2. Related Art

Nowadays, there is an increasing demand for a low profile of a surface light source device with the progress of a low-profile mobile device provided with the surface light source device. In order to reduce a thickness of the surface light source device, it is necessary to reduce a thickness of a light guide plate. However, even if the flat light guide plate can be reduced in thickness, there is a limitation to reducing a height of a light source including an LED. Therefore, in the case where the thin, flat light guide plate is used, the height of the light source is larger than a thickness of an end surface (a light incident surface) of the light guide plate, and the light source disposed opposite to the light incident surface of the light guide plate projects above from an upper surface of the light guide plate. When the light source projects above from the light guide plate, light emitted from the light source is not entirely incident to the light incident surface of the light guide plate, and the light partially leaks to the outside to degrade light use efficiency.

In order to solve the above problem, there has been proposed a use of a light guide plate, in which a light introduction part having a larger thickness than a thickness of a flat light guide plate body is provided at an end of the light guide plate body and an inclined surface inclined from a maximum thickness point of the light introduction part toward the end of the light guide plate body is provided in the light introduction part. For example, WO 2010/070821 and WO 2008/153024 disclose the surface light source devices in each of which the light guide plate is used.

FIG. 1 illustrates an example of a surface light source device 11 in which the light guide plate including the light introduction part thicker than the light guide plate body is used. A light guide plate 13 includes a light guide plate body 14 having a substantially even thickness and a wedge-shaped light introduction part 15. A deflection pattern or a diffusion pattern is formed in a rear surface of the light guide plate body 14, and a lenticular lens 16 is formed on a surface thereof. An inclined surface 17 is formed in the light introduction part 15. The inclined surface 17 is inclined from a point having the maximum thickness of the light introduction part 15 toward an end of the light guide plate body 14. The thickness of an end surface (a light incident surface) of the light introduction part 15 is larger than a height of the light source 12. In the surface light source device 11 in which the light guide plate 13 is used, the thickness of the end surface of the light introduction part 15 is larger than the height of the light source 12, whereby the light introduction part 15 efficiently takes in the light emitted from the light source 12. The light taken in by the light introduction part 15 is guided to the light guide plate body 14 and spread in a flat manner, and the light is reflected by the deflection pattern or the diffusion pattern, and output to the outside from a light exit surface of the light guide plate body 14. At this time, a directional pattern of the light output from the light exit surface is spread by the lenticular lens 16. Therefore, in the surface light source device having the above structure, not only the light use efficiency of the light source can be improved but also the low profile of the surface light source device can be achieved.

However, for the surface light source device 11 in which the inclined surface 17 is provided in the light introduction part 15 as illustrated in FIG. 1, the light traveling in a direction oblique to an optical axis of the light source 12 in the light introduction part 15 is reflected by the inclined surface 17 and spread in a horizontal direction (a width direction of the light guide plate) by an arrow in FIG. 1, and an angle formed by the light and the optical axis of the light source 12 increases when the light guide plate body 14 is viewed from above. As a result, the light laterally spread by the inclined surface 17 leaks from a side surface of the light guide plate 13, or the light is laterally incident to the lenticular lens 16 to leak from the lenticular lens 16, whereby the degradation of the light use efficiency or the degradation of luminance evenness is generated by a light quantity loss.

FIG. 2 is a perspective view of the surface light source device disclosed in WO 2010/070821. In a surface light source device 21 in FIG. 2, a plurality of V-groove light leakage prevention patterns 22 parallel to one another are provided in the inclined surface 17 of the light introduction part 15. The light leakage prevention pattern 22 reduces the light leakage from the inclined surface 17 to improve the light use efficiency. However, at the same time, the light reflected by the light leakage prevention pattern 22 is easily diffused in the horizontal direction compared with the case where only the inclined surface 17 is provided. Therefore, the horizontal spread of the light increases, and the light leaks easily from the side surface of the light guide plate 13. Additionally, in the case where optical patterns, such as the lenticular lens, are provided in the upper surface or the lower surface of the light guide plate 13, the light easily leaks from the optical pattern. As a result, the degradation of the light use efficiency or the degradation of the luminance evenness is also generated by the light quantity loss

SUMMARY

At least one embodiment of the present invention has been made in view of the above technical problems, and an object thereof is to prevent light from leaking from a side surface of a light guide plate or an optical pattern of a light guide plate body in a surface light source device in which a light introduction part of a light guide plate includes an inclined surface.

In accordance with one aspect of at least one embodiment of the present invention, a surface light source device comprises a light source; and a light guide plate configured to introduce light emitted from the light source through a light incident surface to output the light to an outside through a light exit surface, wherein the light source is provided at a position facing the light incident surface of the light guide plate, the light guide plate includes a light introduction part that traps the light, which is emitted from the light source and incident through the light incident surface; and a light guide plate body that is provided so as to be continuously joined to the light introduction part, a thickness of the light guide plate body being smaller than a maximum thickness of the light introduction part, the trapped light being output to the outside through the light exit surface by a light exit part, the light introduction part includes an inclined surface in at least one of a surface on a light exit side of the light guide plate and an opposite surface thereof, the inclined surface being inclined from a surface in a portion having a thickness larger than the thickness of the light guide plate body toward an end of a surface of the light guide plate body, and the light guide plate body includes a directivity conversion pattern in a region located between the light introduction part and an effective lighting region of the light guide plate body in at least one of the surface on the light exit side of the light guide plate and the opposite surface thereof, the directivity conversion pattern converting a directivity direction of the light passing from the light introduction part to the effective lighting region such that an angle formed by the directivity direction of the light and a direction perpendicular to the light incident surface decreases when viewed from a direction perpendicular to the light exit surface. Herein, the directivity direction of the light does not refer individual light direction, but refers to a maximum intensity direction of the directional pattern of the light.

In the surface light source device of at least one embodiment of the present invention, the directivity direction of the light passing from the light introduction part to the effective lighting region can be converted by the directivity conversion pattern provided between the light introduction part and the effective lighting region such that the angle formed by the directivity direction of the light and the direction perpendicular to the light incident surface (hereinafter referred to as a vertical direction) decreases. Therefore, the light guided to the effective lighting region can be prevented from leaking from the side surface of the light guide plate and the optical pattern in the case where the optical pattern of the lenticular lens and the like exist. Therefore, in the surface light source device, the light use efficiency can be enhanced and the degradation of the luminance evenness can be prevented.

In the surface light source device according to at least one embodiment of the present invention, the directivity conversion pattern includes a plurality of pattern elements, and, when viewed from the direction perpendicular to the light exit surface, a distance from a virtual straight line perpendicular to the light incident surface to an end of at least one of the pattern elements on the effective lighting region side is larger than a distance from the virtual straight line to an end of the at least one of the pattern elements on the light introduction part side, and the virtual straight line passes through an emission center of the light source. Accordingly, the light incident from the light source side to the pattern element is reflected by the pattern element, which allows the direction of the light guided to the effective lighting region to come close to the vertical direction.

In the surface light source device according to at least one embodiment of the present invention, on both sides of the virtual straight line, an angle formed by the pattern element and the virtual straight line increases with increasing distance from the virtual straight line when viewed from the direction perpendicular to the light exit surface. Accordingly, the direction of the light incident to each pattern element varies depending on the distance from the light source, so that the directional pattern of the light reflected by each pattern element can be narrowed.

In the surface light source device according to at least one embodiment of the present invention, on both sides of the virtual straight line, the pattern elements are arranged in parallel with each other when viewed from the direction perpendicular to the light exit surface. Accordingly, the pattern elements are parallel to each other on both the sides of the virtual straight line, so that a molding die used to mold the light guide plate can be simplified to reduce production cost.

In the surface light source device according to at least one embodiment of the present invention, the directivity conversion pattern in the region located between the light introduction part and the effective lighting region of the light guide plate body is partially removed to form a flat surface in proximity to a virtual straight line perpendicular to the light incident surface, and the virtual straight line passes through an emission center of the light source. Accordingly, the direction of the light that is emitted forward from the light source is hardly bent in the horizontal direction due to the directivity conversion pattern. Therefore, the directivity conversion pattern can prevent the decrease in luminance in front of or near the light source.

In the surface light source device according to at least one embodiment of the present invention, the directivity conversion pattern includes the plurality of pattern elements, and at least some of the pattern elements have asymmetric shapes in a cross section of the directivity conversion pattern parallel to the light incident surface. Accordingly, because the pattern element has the asymmetric shape, a degree of freedom increases in the design of the directivity conversion pattern.

In the surface light source device according to at least one embodiment of the present invention, the directivity conversion pattern is formed by alternately arranging slopes having inclined directions different from each other along a width direction of the light incident surface, in the cross section of the directivity conversion pattern parallel to the light incident surface, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that a sum of widths of slopes in each of which the normal line is inclined to an opposite side of the virtual straight line is larger than a sum of widths of slopes in each of which the normal line is inclined to the virtual straight line side, and the virtual straight line passes through an emission center of the light source. Accordingly, an area of the slope that highly contributes to converting the direction of the reflected light to the vertical direction can be enlarged, to thereby enhance the effect to prevent the light leakage.

In the surface light source device according to at least one embodiment of the present invention, the directivity conversion pattern is formed by alternately arranging slopes having inclined directions different from each other along a width direction of the light incident surface, in the cross section parallel to the light incident surface of the directivity conversion pattern, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that a ratio of a sum of widths of slopes in each of which the normal line is inclined to an opposite side of the virtual straight line to a sum of the sum of the widths of the slopes in each of which the normal line is inclined to the opposite side of the virtual straight line and a sum of widths of slopes in each of which the normal line is inclined to the virtual straight line side is greater than or equal to 0.2, and the virtual straight line passes through an emission center of the light source. Accordingly, the light use efficiency is improved by at least 2% compared with the conventional example.

In the surface light source device according to at least one embodiment of the present invention, the directivity conversion pattern is formed by alternately arranging slopes having inclined directions different from each other along a width direction of the light incident surface, in the cross section parallel to the light incident surface of the directivity conversion pattern, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that an average angle of angles each of which is formed by the normal line belonging to the slope in which the normal line is inclined to the virtual straight line side and the direction perpendicular to the light exit surface is larger than an average angle of angles each of which is formed by the normal line belonging to the slope in which the normal line is inclined to an opposite side of the virtual straight line and the direction perpendicular to the light exit surface, and the virtual straight line passes through an emission center of the light source. Accordingly, the area of the slope that highly contributes to converting the direction of the reflected light to the vertical direction can be enlarged, to thereby enhance the effect to prevent the light leakage.

In the surface light source device according to at least one embodiment of the present invention, the directivity conversion pattern is formed by alternately arranging slopes having inclined directions different from each other along a width direction of the light incident surface, in the cross section parallel to the light incident surface of the directivity conversion pattern, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that a ratio of an average angle of angles each of which is formed by the normal line belonging to the slope in which the normal line is inclined to an opposite side of the virtual straight line and the direction perpendicular to the light exit surface to a sum of the average angle of the angles each of which is formed by the normal line belonging to the slope in which the normal line is inclined to the opposite side of the virtual straight line and an average angle of angles each of which is formed by the normal line belonging to the slope in which the normal line is inclined to the virtual straight line side and the direction perpendicular to the light exit surface is greater than or equal to 0.25, and the virtual straight line passes through an emission center of the light source. Accordingly, the light use efficiency is improved by at least 2% compared with the conventional example.

In the surface light source device according to at least one embodiment of the present invention, the directivity conversion pattern includes a plurality of pattern elements having V-groove shapes. Accordingly, the structure of the directivity conversion pattern is simplified.

In the surface light source device according to at least one embodiment of the present invention, a vertex angle between the pattern elements adjacent to each other ranges from 50° to 140°. This is because the light use efficiency may possibly decrease when the vertex angle between the pattern elements adjacent to each other is less than 50° or greater than 140°.

In the surface light source device according to at least one embodiment of the present invention, a light diffusion pattern for spreading the light incident through the light incident surface in the width direction of the light guide plate is provided in the light introduction part. There is no particular limitation to the position where the light diffusion pattern is provided. For example, the light diffusion pattern may be provided in the upper surface and the lower surface of the light introduction part, the upper surface or the lower surface that is the inclined surface, and the light incident surface. Accordingly, the light that enters the light introduction part from the light incident surface is laterally spread by the light diffusion pattern, and then converted to the vertical direction by the directivity conversion pattern. The luminance at the edge of the light guide plate is enhanced by sending the light to the proximity of the side surface of the light guide plate. At the same time, the direction of the light is aligned in the vertical direction to hardly leak from the side surface of the light guide plate or the optical pattern of the lenticular lens. Therefore, the evenness of the luminance and the improvement of the light use efficiency can be achieved.

In the surface light source device according to at least one embodiment of the present invention, the light exit surface is formed into a lenticular lens shape. Accordingly, the directional pattern of the light output from the light exit surface can laterally be spread by the lenticular lens shape.

In the surface light source device according to at least one embodiment of the present invention, a plurality of light sources, each identical to the light source, are disposed at intervals P in positions facing the light incident surface, and the directivity conversion pattern exists in a region less than or equal to a distance of $$P/[2 \cdot \arcsin(1/n)]$$

from an end surface on a light exit side of the light source, where n is a refractive index of the light guide plate. This is because, when the region where the directivity conversion pattern is formed extends beyond $P/[2 \cdot \arcsin(1/n)]$ from the end surface on the light exit side of the light source, the light emitted from a certain light source enters the region in front of the adjacent light source to decrease the light use efficiency.

The liquid crystal display device according to at least one embodiment of the present invention includes the surface light source device according to at least one embodiment of the present invention and the liquid crystal panel. The light use efficiency can be enhanced in the liquid crystal display device and the degradation of the evenness of the luminance can be prevented because the surface light source device of at least one embodiment of the present invention is used in the liquid crystal display device.

Many variations can be made in the invention by using various combinations of the elements described herein.

DETAILED DESCRIPTION

Hereinafter, preferred embodiments of the present invention will be described in detail with reference to the accompanying drawings. However, the present invention is not limited to the following embodiments, and various design changes can be made without departing from the scope of the present invention.

First Embodiment

Figure 3:
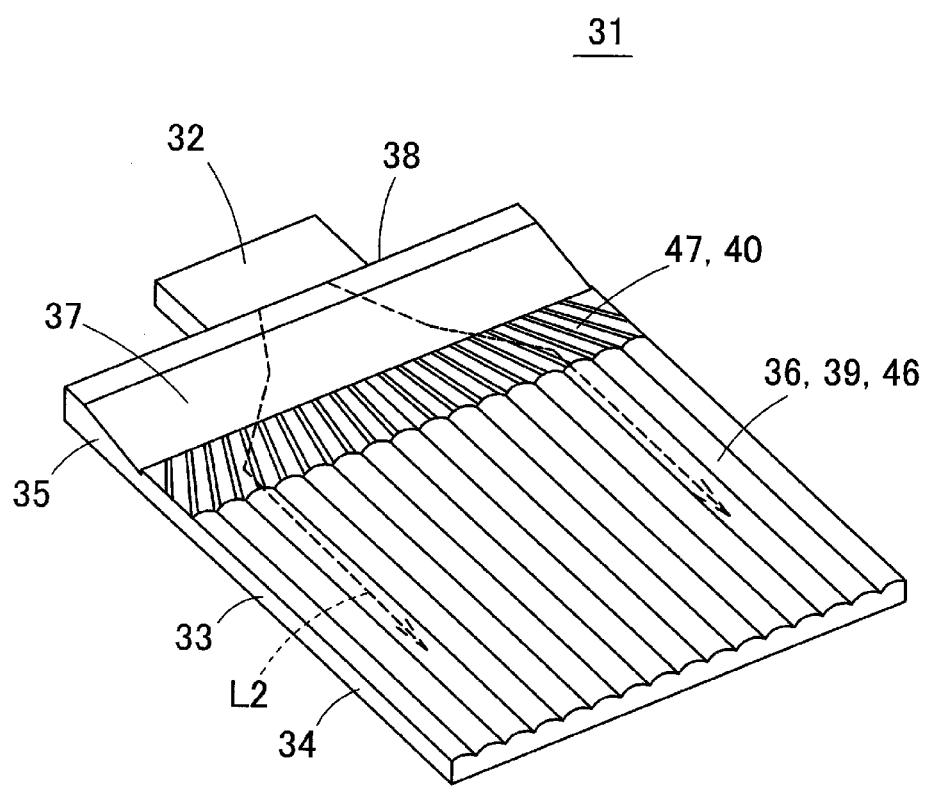
FIG. 3 is a perspective view illustrating a surface light source device according to a first embodiment of the present invention.
Figure 4:
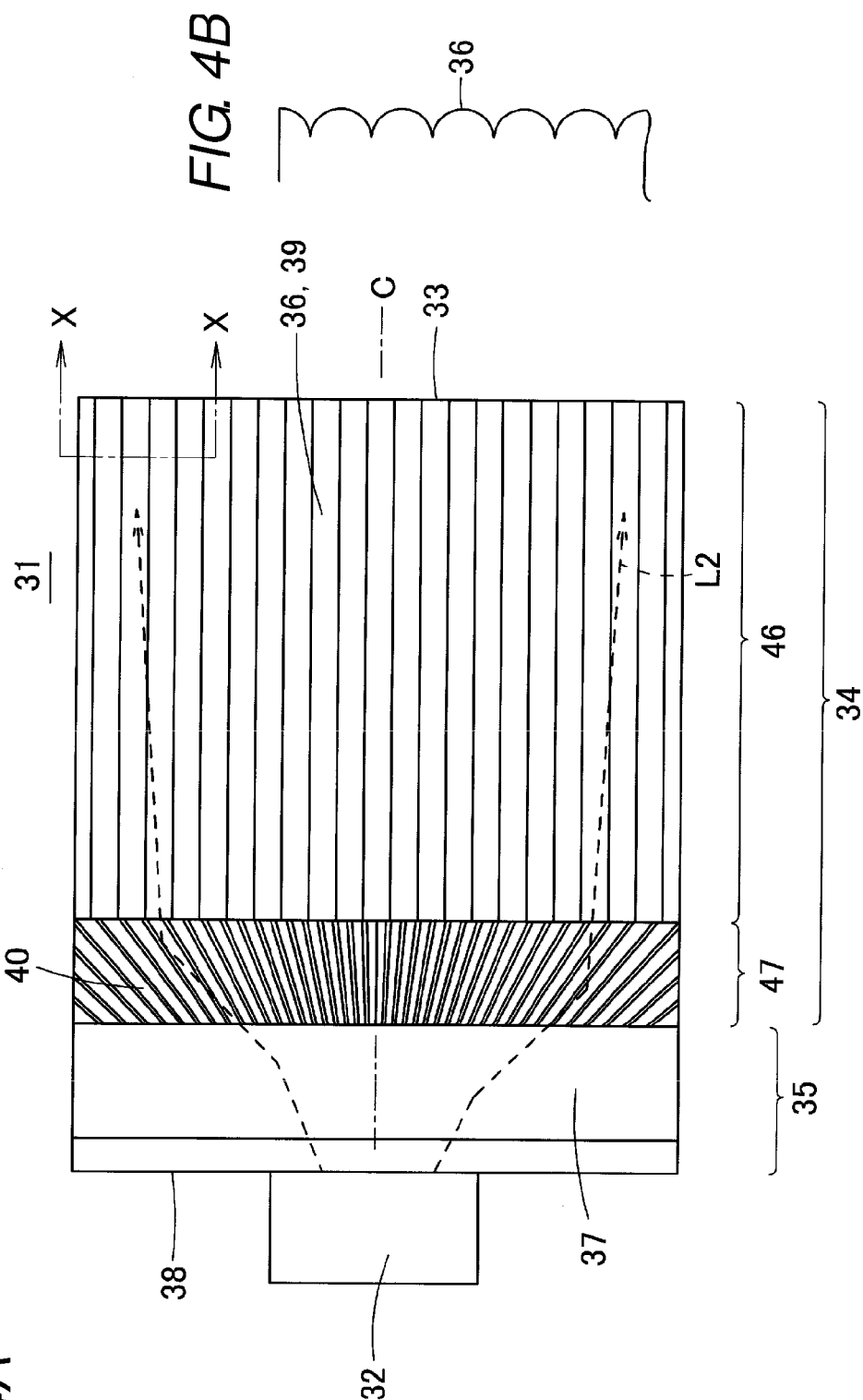
FIG. 4A is a plan view of the surface light source device in FIG. 3.
FIG. 4B is an enlarged sectional view taken along line X-X in FIG. 4A, and illustrates a cross sectional shape of a lenticular lens.
Figure 5:
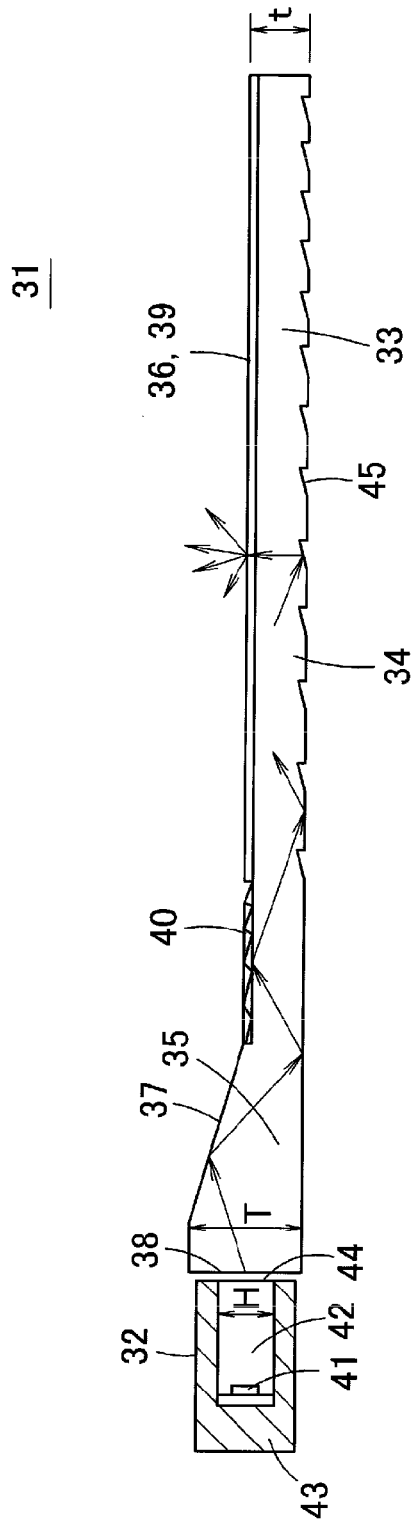
FIG. 5 is a schematic sectional view of the surface light source device in FIG. 3.
Figure 6:
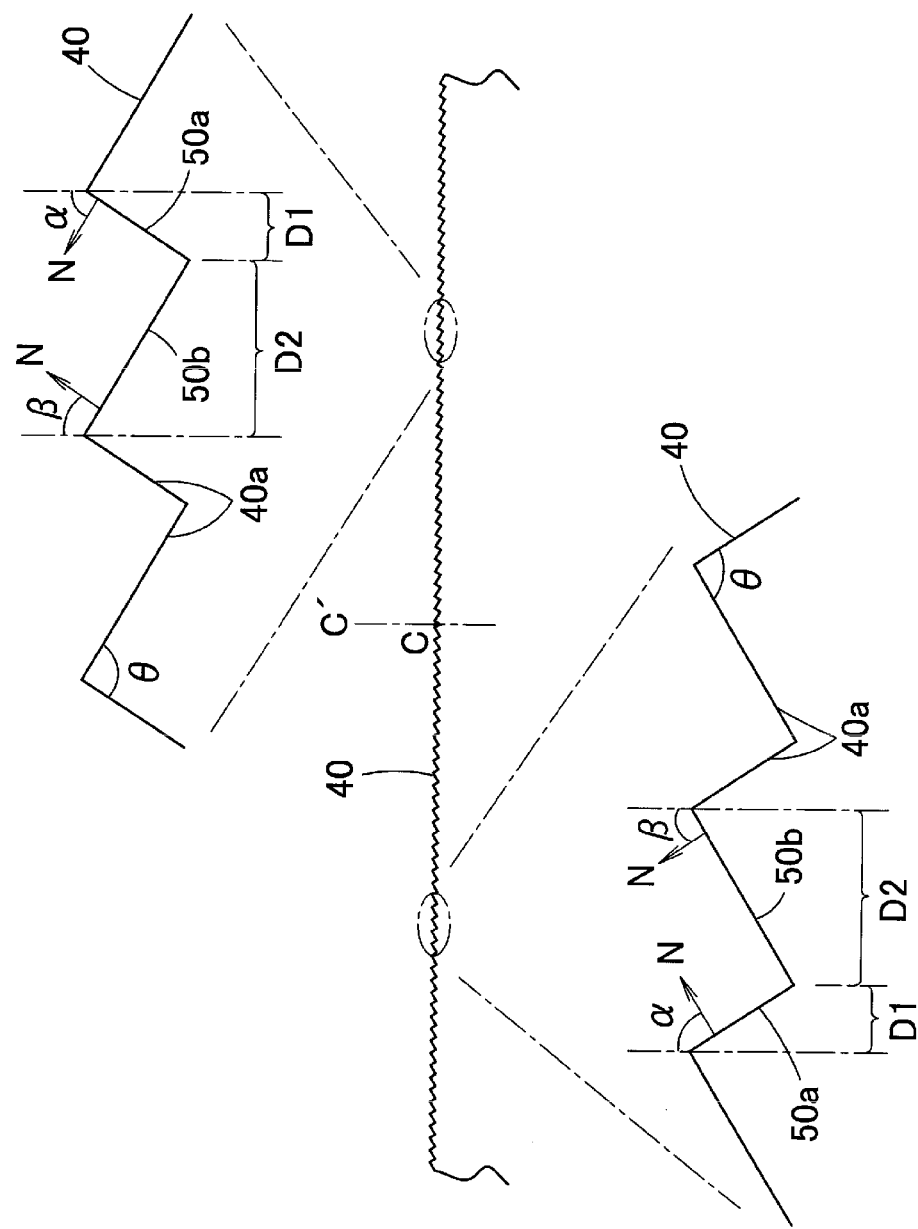
FIG. 6 is a sectional view illustrating a shape of a directivity conversion pattern in a section parallel to a light incident surface and a part thereof in an enlarged form.
Figure 7A:
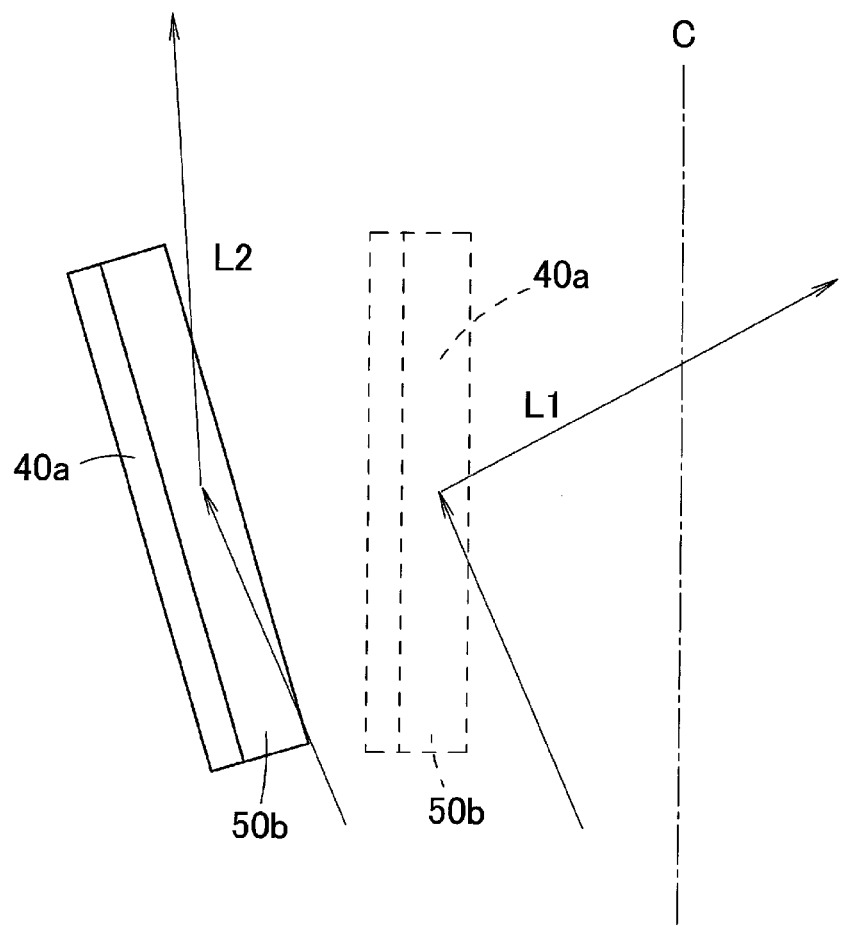
FIGS. 7A and 7B are explanatory views illustrating action of the directivity conversion pattern.
Figure 7B:
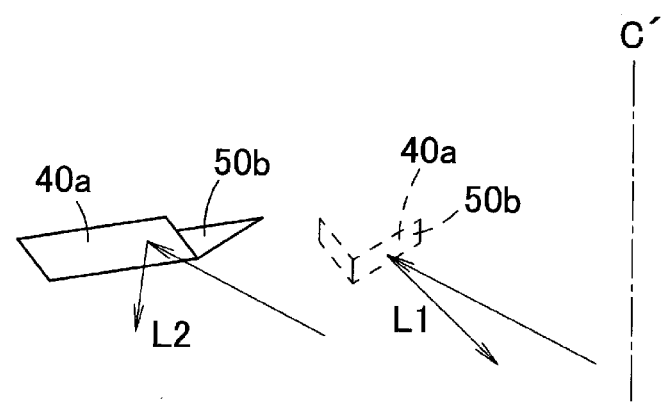

A surface light source device 31 according to a first embodiment of the present invention will be described below with reference to FIGS. 3 to 7B. FIG. 3 is a perspective view illustrating the surface light source device 31 of the first embodiment, and FIG. 4A is a plan view of the surface light source device 31. FIG. 4B is a sectional view taken along line X-X in FIG. 4A, and illustrates a section of a lenticular lens 36 provided in a surface of a light guide plate 33. FIG. 5 is a schematic sectional view along a longitudinal direction (a direction perpendicular to a light incident surface 38) of the surface light source device 31, and illustrates a behavior of a ray in the light guide plate 33. FIG. 6 is a view illustrating a section of a directivity conversion pattern 40 in a section parallel to the light incident surface 38 of the light guide plate 33, and also illustrates a part of the directivity conversion pattern 40 in an enlarged form. FIGS. 7A and 7B illustrate behaviors of light reflected by the directivity conversion pattern.

The surface light source device 31 includes a point light source 32 (a light source) and a light guide plate 33. The point light source 32 is provided with one or a plurality of LEDs, and emits white light. As illustrated in FIG. 5, an LED 41 is sealed in a transparent sealing resin 42, the transparent sealing resin 42 is covered with a white resin 43 except for a front surface, and the front surface exposed from the white resin 43 of the transparent sealing resin 42 constitutes a light exit window 44 (an emission surface). The point light source 32 is smaller than a width of the light guide plate 33, and the point light source 32 is called a point light source whereas a cold-cathode tube is called a linear light source.

In the light guide plate 33, a light introduction part 35 is provided in an end surface of a thin-plate-like light guide plate body 34 so as to be continuously joined to the light guide plate body 34. The light guide plate 33 is integrally formed using high-refractive-index transparent resins, such as an acrylic resin, a polycarbonate resin (PC), a cycloolefin-based material, and polymethylmethacrylate (PMMA).

The light introduction part 35 is a thick, substantially wedge-shaped portion in the light guide plate 33, and the point light source 32 is disposed so as to face a part of the light incident surface 38 that is the end surface of the light introduction part 35. A thickness T of the end surface of the light introduction part 35 is equal to or greater than a height H of the light exit window 44, and therefore the light emitted from the point light source 32 is efficiently incident from the light incident surface 38 to the light introduction part 35 to enhance the light use efficiency of the surface light source device 31.

An inclined surface 37 is formed in an upper surface (a surface on the same side as a light exit surface 39 of the light guide plate body 34) of the light introduction part 35. The inclined surface 37 is inclined from the portion having the maximum thickness near the light incident surface 38 toward an end of the light guide plate body 34. The band-like inclined surface 37 extends from one side edge of the light guide plate 33 to the other side edge. In the surface light source device 31 of the first embodiment, the inclined surface 37 is smoothly formed.

The light guide plate body 34 constitutes most part of the light guide plate 33. A thickness t of the light guide plate body 34 is smaller than the maximum thickness T of the light introduction part 35, thereby achieving the low profile of the light guide plate 33. The light guide plate body 34 has a flat-plate shape in which the surface and the rear surface are parallel to each other, and the light guide plate body 34 has a substantially even thickness. As illustrated in FIG. 4A, most part of the light guide plate body 34 constitutes an effective lighting region 46, and an end-portion region adjacent to the light introduction part 35 constitutes a pattern forming region 47.

The effective lighting region 46 is a region from which the light having even luminance is output, and the effective lighting region 46 corresponds to a display region of the liquid crystal panel stacked on the surface light source device 31. The upper surface of the effective lighting region 46 constitutes the light exit surface 39, and the lenticular lens 36 is molded in the light exit surface 39 of the effective lighting region 46. As illustrated in FIGS. 4A and 4B, in the lenticular lens 36, convex lenses are laterally arranged while extending in parallel to a longitudinal direction of the light guide plate body 34, and the lens surface is arranged in a width direction. The lenticular lens laterally spreads a directional pattern of the light output from the light exit surface 39. A light exit part 45 is provided in an opposite surface (a lower surface) of the light exit surface 39 in the effective lighting region 46. In FIG. 5, a triangular groove pattern is illustrated as the light exit part 45. Alternatively, for example, a pattern formed by sandblasting, a pattern formed by photographic printing using diffusion ink, a diffraction grating pattern, and any irregular pattern may be used as the light exit part 45. The light exit part 45 may be provided in the light exit surface 39 of the light guide plate body 34 or in both the light exit surface 39 and the opposite surface thereof.

The pattern forming region 47 is located in the end portion of the light guide plate body 34, and is a belt-like region located between the end (the lower end of the inclined surface 37) of the light introduction part 35 and the end of the effective lighting region 46. The directivity conversion pattern 40 is provided in the upper surface and/or the lower surface of the pattern forming region 47. As illustrated in FIGS. 4A and 6, a plurality of pattern elements 40a having V-groove shapes are radially arranged in the directivity conversion pattern 40. When viewed in the direction perpendicular to the light exit surface 39, each pattern element 40a passes through an emission center of the point light source 32, and is inclined with respect to a virtual straight line (hereinafter referred to as an optical axis C of the point light source 32) perpendicular to the light incident surface 38, and the inclined directions of the pattern elements 40a are opposite to each other with respect to both the sides of the optical axis C. In each pattern element 40a, an angle with the optical axis C increases gradually with increasing distance from the optical axis C.

As illustrated in FIG. 6, each pattern element 40a is constructed by two slopes in which both inclined angles and inclined directions differ from each other in the cross section parallel to the light incident surface 38, and the pattern element 40a has an asymmetric V-groove shape. Accordingly, slopes having the different inclined directions are alternately arranged in the directivity conversion pattern 40.

The cross sectional shape of the directivity conversion pattern 40 has the following feature. In the cross section parallel to the light incident surface 38, assuming that a normal line N is drawn outward from the inside of the light guide plate 33 in the slope of each pattern element 40a, a sum of widths D2 of slopes 50b in each of which the normal line N is inclined to an opposite side of a perpendicular line C' orthogonal to the optical axis C is larger than a sum of widths D1 of slopes 50a in each of which the normal line N is inclined to the side of the perpendicular line C'. At this time, each of the sum of the widths D2 of the slopes 50b and the sum of the widths D1 of the slopes 50a is individually calculated in the right region and the left region of the optical axis C, and the sum of the widths D2 of the slopes 50b is larger than the sum of the widths D1 of the slopes 50a on both the sides of the optical axis C. Particularly, in the example in FIG. 6, the width D2 of the slope 50b in which the normal line N is inclined to the opposite side of the perpendicular line C' is larger than the width D1 of the slope 50a in which the normal line N is inclined to the side of the perpendicular line C' for the two slopes 50a and 50b that are adjacent to each other at any point.

The feature of the cross sectional shape of the directivity conversion pattern 40 can also be expressed as follows. An average angle of angles $\alpha$ (or the inclined angles of the slopes 50a) each of which is formed by the perpendicular line C' and the normal line N of the slope 50a inclined to the side of the perpendicular line C' is larger than an average angle of angles $\beta$ (or the inclined angles of the slopes 50b) each of which is formed by the perpendicular line C' and the normal line N of the slope 50b inclined to the side of the perpendicular line C'. As used herein, the average angle of the angles $\alpha$ each of which is formed by the perpendicular line C' and the normal line N of the slope 50a inclined to the side of the perpendicular line C' is defined by $$\Sigma \alpha_i \times D1_i / \Sigma D1_i$$

Figure 14:
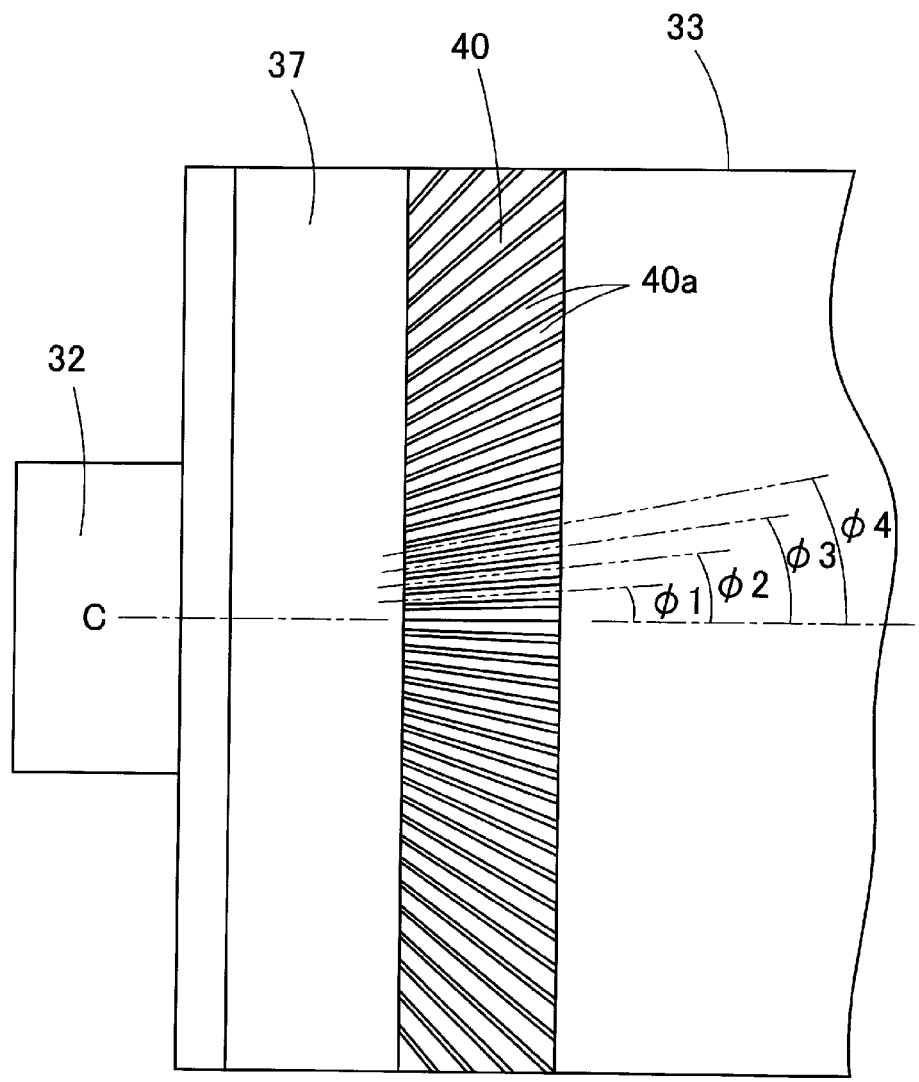
FIG. 14 is a view illustrating the average opening angle of the directivity conversion pattern.

(see FIG. 14). Herein, $\alpha_i$ is an angle formed by the perpendicular line C' and the normal line N of the slope 50a inclined to the side of the perpendicular line C', and $D1_i$ is a width of each slope 50a (i is an index added to each slope 50a). The sums of a denominator and a numerator are calculated with respect to the slope 50a in the right or left region of the optical axis C. Similarly, the average angle of the angles $\beta$ each of which is formed by the perpendicular line C' and the normal line N of the slope 50b inclined to the opposite side of the perpendicular line C' is defined by $$\Sigma \beta_j \times D2_j / \Sigma D2_j$$

(see FIG. 14). Herein, $\beta j$ is an angle formed by the perpendicular line C' and the normal line N of the slope 50b inclined to the opposite side of the perpendicular line C', and D2j is a width of each slope 50b (j is an index added to each slope 50b). The sums of a denominator and a numerator are calculated with respect to the slope 50b in the right or left region of the optical axis C. The magnitudes of the average angles are compared to each other in each of the right and left regions of the optical axis C. Particularly, in the example in FIG. 6, for the two slopes 50a and 50b that are adjacent to each other at any point, the angle $\alpha$ formed by the perpendicular line C' and the normal line N of the slope 50a inclined to the side of the perpendicular line C' is larger than the angle $\beta$ formed by the perpendicular line C' and the normal line N inclined to the opposite side of the perpendicular line C'.

In the drawings, optical patterns, such as the lenticular lens 36 and the directivity conversion pattern 40, are coarsely drawn for the sake of convenience. However, actually the optical patterns are finely formed with micrometer accuracy.

In the surface light source device 31, as indicated by an arrow in FIG. 5, the light emitted from the point light source 32 is incident through the light incident surface 38 to the light introduction part 35, the light is reflected by the upper or lower surface of the light introduction part 35 or passes through the light introduction part 35, and the light is introduced to the thin light guide plate body 34. The light introduced to the light guide plate body 34 is guided in the light guide plate body 34 while being reflected by the directivity conversion pattern 40, the lenticular lens 36, and the lower surface of the light guide plate body 34. Then, the light is reflected or diffused by the light exit part 45, and substantially evenly output from the light exit surface 39.

At this time, as illustrated in FIGS. 3 and 4, light L2 incident to the directivity conversion pattern 40 is reflected and bent by the directivity conversion pattern 40 so as to come close to the direction parallel to the optical axis C, namely, the light is converted by the directivity conversion pattern 40 such that the angle with the optical axis C decreases as much as possible. FIGS. 7A and 7B are views illustrating behaviors of the light L2 reflected by the directivity conversion pattern 40, where FIG. 7A is a view illustrating the behavior of the light L2 when the light guide plate 33 is viewed from above, and FIG. 7B is a view illustrating the behavior of the light L2 when the light L2 is viewed in the direction perpendicular to the light incident surface 38 (from the point light source side).

As indicated by broken lines in FIGS. 7A and 7B, in the case where the pattern element 40a is disposed in parallel with the optical axis C, because light L1 reflected by the slope 50b is laterally spread, the light L1 may leak from the side surface of the light guide plate 33 or the lenticular lens 36.

On the other hand, in the surface light source device 31 of the first embodiment, as indicated by solid lines in FIGS. 7A and 7B, the directivity conversion pattern 40 is disposed so as to be oblique to the optical axis C. Therefore, the light L2 is reflected by the slope 50b of the pattern element 40a so as to come close to the direction parallel to the optical axis C when viewed from above, and the light L2 is oriented forward. As a result, in the surface light source device 31 of the first embodiment, the light reflected by the pattern element 40a hardly reaches the side surface of the light guide plate 33, and is hardly incident to the lenticular lens 36 from the lateral direction. Therefore, the leakage of the light from the side surface of the light guide plate 33 or the lenticular lens 36 can be reduced to enhance the light use efficiency, and the luminance of the surface light source device 31 can be improved.

Additionally, in the directivity conversion pattern 40 of the first embodiment, an angle formed by the pattern element 40a and the optical axis C increases with increasing distance from the optical axis C. In the light incident from the point light source 32 to the pattern element 40a, the angle with the length direction of the pattern element 40a increases with increasing distance from the optical axis C. Accordingly, the angle formed by the pattern element 40a and the optical axis C is increased with increasing distance from the optical axis C, which allows the light to be bent forward irrespective of the distance from the optical axis C.

However, in the effect of at least one embodiment of the present invention, the light reflected by the directivity conversion pattern 40 is not entirely bent in the direction parallel to the optical axis C. The whole directional pattern of the light reflected by the directivity conversion pattern 40, particularly a maximum luminance direction of the light is converted so as to be oriented toward the direction parallel to the optical axis C.

Figure 1:
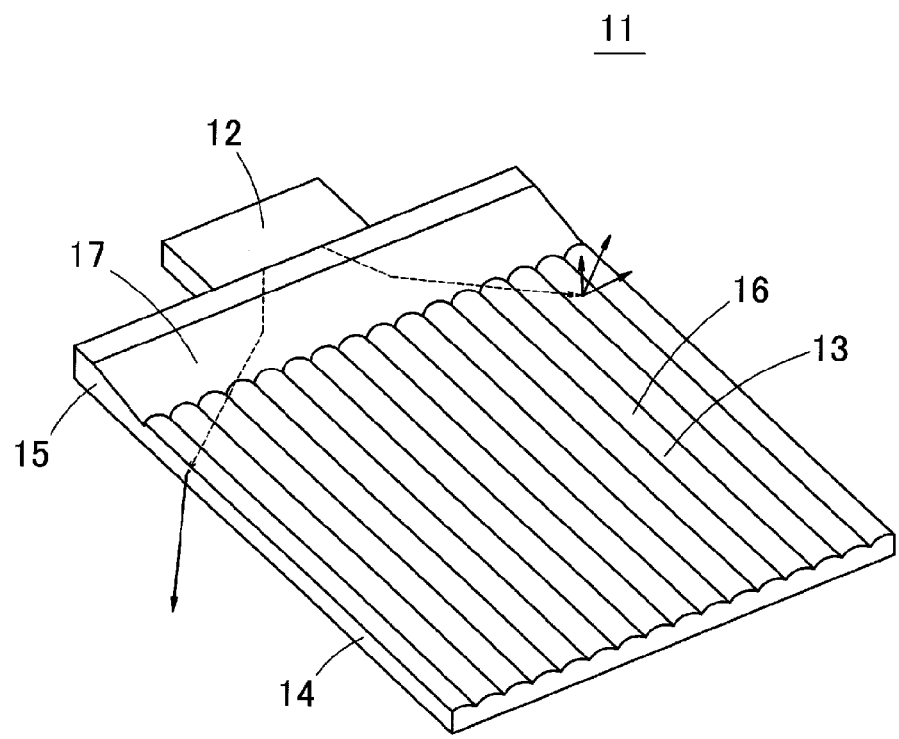
FIG. 1 is a perspective view illustrating a conventional surface light source device.
Figure 2:
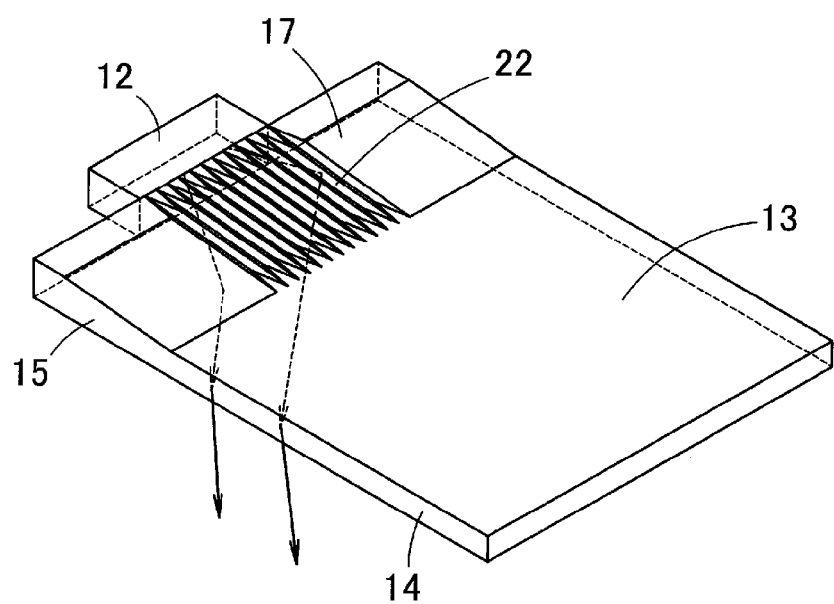
FIG. 2 is a perspective view of a surface light source device disclosed in WO 2010/070821.
Figure 8A:
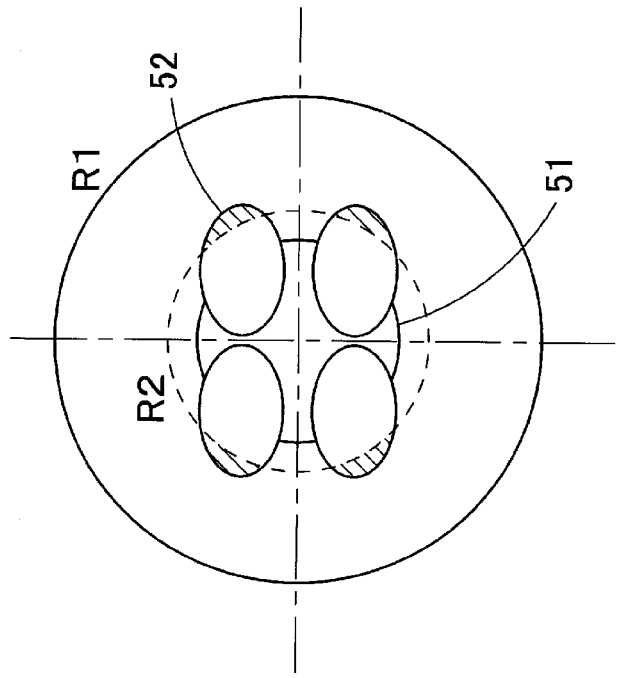
FIG. 8A is a view illustrating a light guide directivity viewed from a direction perpendicular to a light incident surface of a light guide plate in the conventional example in FIG. 1.
Figure 8B:
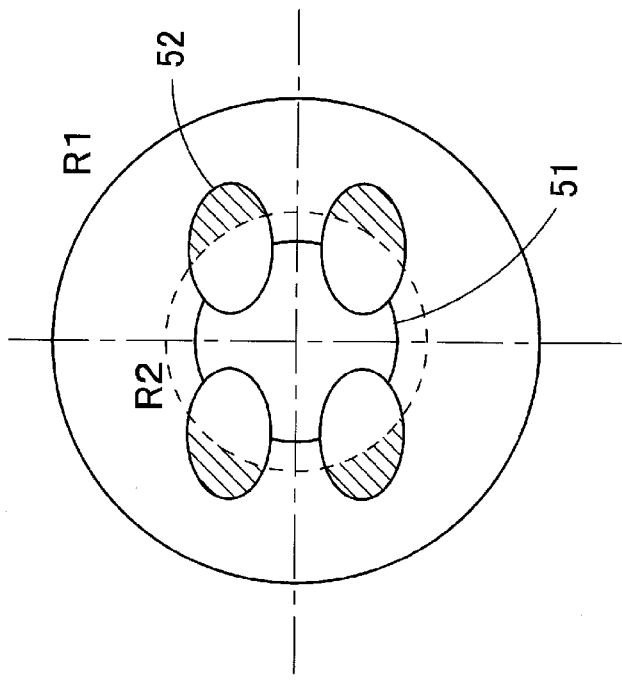
FIG. 8B is a view illustrating the light guide directivity viewed from the direction perpendicular to the light incident surface of the light guide plate in the first embodiment of the present invention.

FIG. 8A is a view illustrating light guide directivity viewed from the direction perpendicular to the light incident surface of the light guide plate 13 in the case where the directivity conversion pattern is not provided in the light guide plate body 14 (the conventional example in FIG. 1). FIG. 8B is a view illustrating the light guide directivity viewed from the direction perpendicular to the light incident surface 38 of the light guide plate 33 in the case where the directivity conversion pattern 40 is provided in the light guide plate body 34 (the first embodiment). In FIGS. 8A and 8B, R1 indicates a spherical surface having a radius of 1 and R2 indicates a circle, which is formed such that a circular cone having the same angle as a critical angle arcsin(1/n) [where n is a refractive index of the light guide plate] of reflection with respect to the optical axis C intersects with the spherical surface R1. The light guide directivity (the directional pattern) is described in detail in WO 2010/070821 and WO 2008/153024.

In FIGS. 8A and 8B, directivity 51 indicates the directional pattern of the light immediately after the light is incident to the light introduction parts 15 and 35. In FIG. 8A, directivity 52 indicates the directional pattern of the light reflected by the inclined surface 17 of the light introduction part 15. In FIG. 8B, directivity 52 indicates the directional pattern of the light, which is reflected by the inclined surface 37 of the light introduction part 35 and further reflected by the directivity conversion pattern 40. When the directivity is located in the region outside the circle R2, the light leaks from the side surface of the light guide plate or the lenticular lens. Therefore, in the directional pattern of the conventional example in FIG. 8A, there is a significantly large amount of light leaking from the light guide plate 13 (a hatched region). On the other hand, in the surface light source device 31 in which the directivity conversion pattern 40 is provided, the directivity conversion pattern 40 reflects the light to pull the directivity 52 inward. Therefore, as indicated by the hatching in FIG. 8B, the amount of light spreading out from the circle R2 decreases, and the leakage of light from the light guide plate 33 is reduced.

In the surface light source device 31 of the first embodiment, as illustrated in FIG. 6, the sum of the widths of the slopes 50b in each of which the normal line is inclined to the opposite side of the perpendicular line C' in the directivity conversion pattern 40 is larger than the sum of the widths of the slopes 50a in each of which the normal line is inclined to the side of the perpendicular line C'. Therefore, an area of the surface (the slope 50b), which reflects the light toward the direction parallel to the optical axis C as illustrated in FIG. 7, can be enlarged to enhance the effect that the directional pattern of the light is converted to the direction parallel to the optical axis C.

Figure 9:
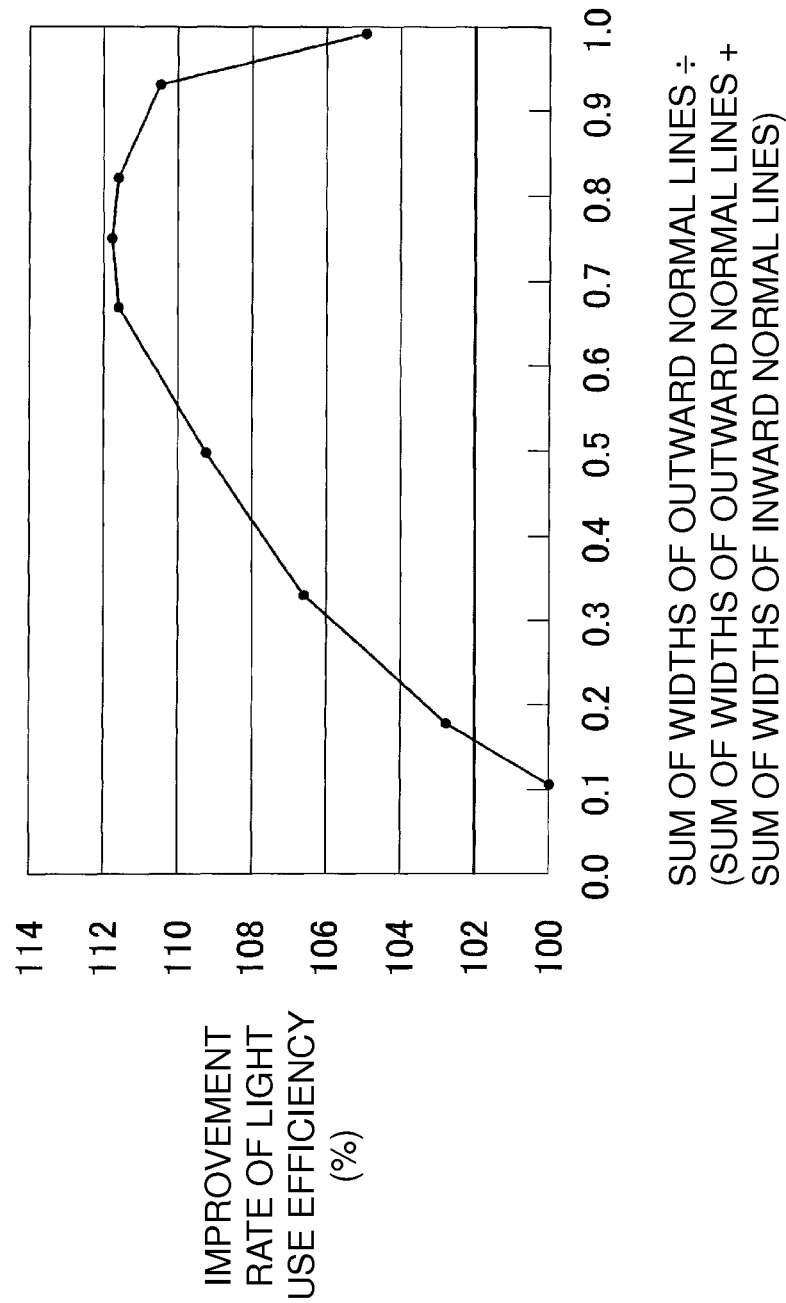
FIG. 9 is a view illustrating a relationship between (sum of widths of outward normal lines)/(sum of widths of outward normal lines+sum of widths of inward normal lines) of the directivity conversion pattern and an improvement rate of light use efficiency.
Figure 11:
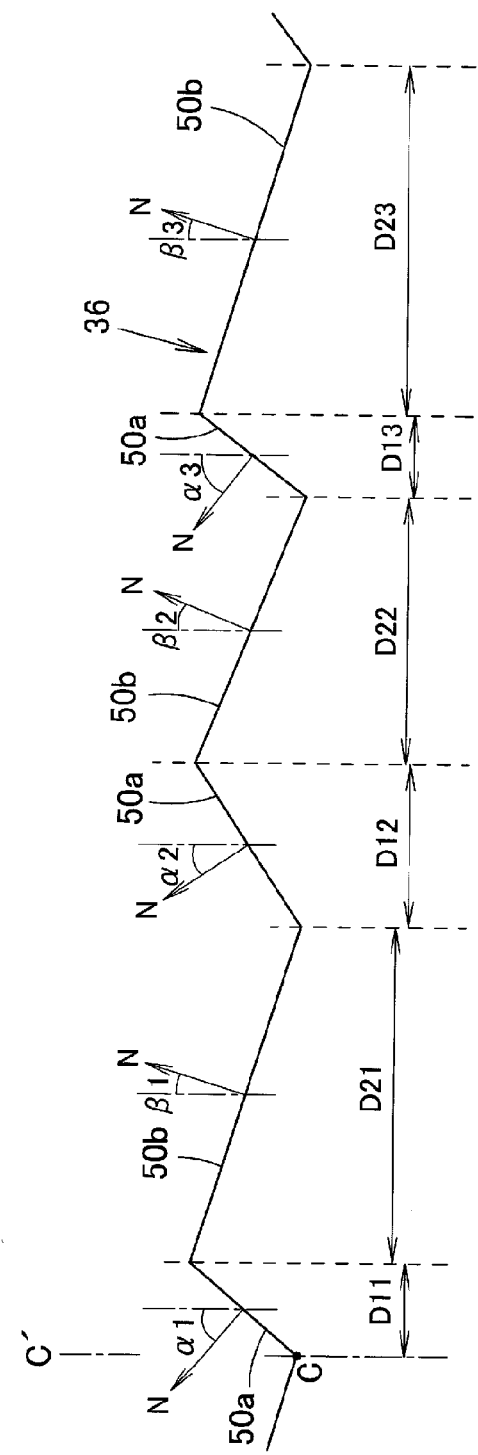
FIG. 11 is a view illustrating a method for obtaining the sum of the widths of the outward or inward normal lines and the average angle of the outward or inward normal lines.

A looser condition can be set in the embodiments of the present invention. FIG. 9 is a view illustrating a relationship between (sum of widths of outward normal lines)/(sum of widths of outward normal lines+sum of widths of inward normal lines) of the directivity conversion pattern and an improvement rate of light use efficiency. Referring to FIG. 11, in the cross section parallel to the light incident surface 38, assuming that the normal line N is drawn outward from the inside of the light guide plate 33 in the slope of each pattern element 40a, the outward normal line refers to the normal line N that is inclined to the opposite side of the perpendicular line C' orthogonal to the optical axis C. The width of the outward normal line refers to the width D2 of the slope 50b having the outward normal line. Referring to FIG. 11, in the cross section parallel to the light incident surface 38, assuming that the normal line N is drawn outward from the inside of the light guide plate 33 in the slope of each pattern element 40a, the inward normal line refers to the normal line N that is inclined to the side of the perpendicular line C' orthogonal to the optical axis C. The width of the inward normal line refers to the width D1 of the slope 50a having the inward normal line.

Accordingly, referring to FIG. 11, the sum of the widths of the outward normal lines is obtained by adding widths D21, D22, . . . of the outward normal lines, namely, D21+D22+ . . . in one of the right and left regions of the optical axis C. Similarly, the sum of the widths of the inward normal lines is obtained by adding widths D11, D12, . . . of the inward normal lines, namely, D11+D12+ . . . in one of the right and left regions of the optical axis C.

As can be seen from FIG. 9, when (sum of widths of outward normal lines)/(sum of widths of outward normal lines+sum of widths of inward normal lines) of the directivity conversion pattern is greater than or equal to 0.1, the effect to improve the light use efficiency is recognized compared with the conventional example. When (sum of widths of outward normal lines)/(sum of widths of outward normal lines+sum of widths of inward normal lines) is greater than or equal to 0.2, the directivity conversion pattern is of practical value because the effect to improve the light use efficiency is obtained by at least 2% compared with the conventional example. As can be seen from FIG. 9, the high effect to improve the light use efficiency is obtained, when (sum of widths of outward normal lines)/(sum of widths of outward normal lines+sum of widths of inward normal lines) is greater than or equal to 0.5, namely, when the sum of the widths of the outward normal lines is greater than the sum of the widths of the inward normal lines. Particularly, the highest effect is obtained when (sum of widths of outward normal lines)/(sum of widths of outward normal lines+sum of widths of inward normal lines) is 0.75.

Figure 10:
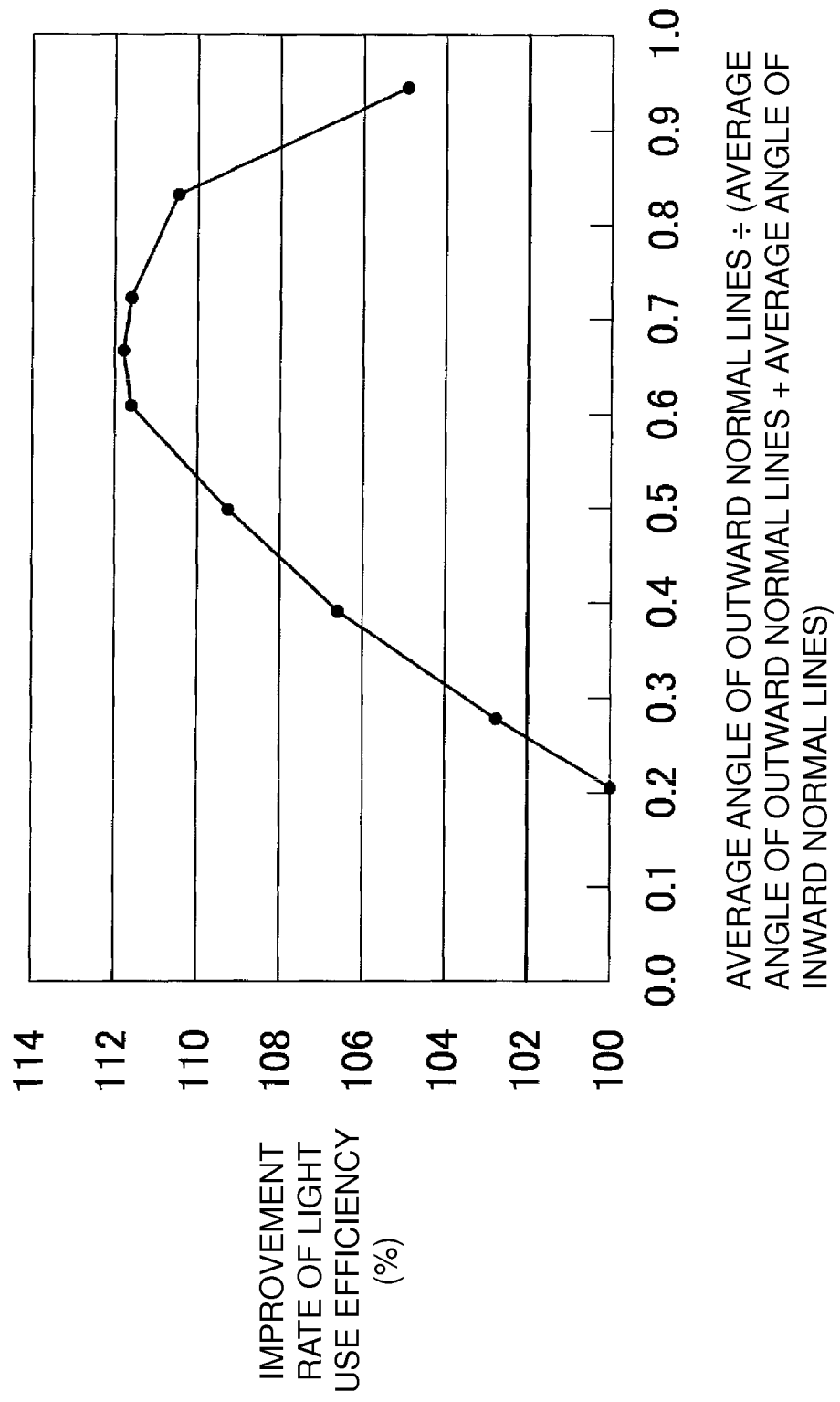
FIG. 10 is a view illustrating a relationship between (average angle of outward normal lines)/(average angle of outward normal lines+average angle of inward normal lines) of the directivity conversion pattern and the improvement rate of light use efficiency.

FIG. 10 is a view illustrating a relationship between (average angle of outward normal lines)/(average angle of outward normal lines+average angle of inward normal lines) of the directivity conversion pattern and the improvement rate of light use efficiency. Referring to FIG. 11, the average angle of the outward normal lines is defined by ($\beta_1 \times D21 + \beta_2 \times D22 + \ldots$)/($D21 + D22 + \ldots$)

where $\beta_1, \beta_2, \ldots$ are angles each of which is formed by the outward normal line and the perpendicular line C' in the cross section parallel to the light incident surface 38 and in one of the right and left regions of the optical axis C, and D21, D22, . . . are widths of the slopes having the outward normal lines. Similarly, the average angle of the inward normal lines is defined by ($\alpha_1 \times D11 + \alpha_2 \times D12 + \ldots$)/($D11 + D12 + \ldots$)

where $\alpha_1, \alpha_2, \ldots$ are angles each of which is formed by the inward normal line and the perpendicular line C' in the cross section parallel to the light incident surface 38 and in one of the right and left regions of the optical axis C, and D11, D12, . . . are widths of the slopes having the inward normal lines.

As can be seen from FIG. 10, when (average angle of outward normal lines)/(average angle of outward normal lines+average angle of inward normal lines) of the directivity conversion pattern is greater than or equal to 0.2, the effect to improve the light use efficiency is recognized compared with the conventional example. When (average angle of outward normal lines)/(average angle of outward normal lines+average angle of inward normal lines) is greater than or equal to 0.25, the directivity conversion pattern is of practical value because the effect to improve the light use efficiency is obtained by at least 2% compared with the conventional example. As can be seen from FIG. 10, when (average angle of outward normal lines)/(average angle of outward normal lines+average angle of inward normal lines) is greater than or equal to 0.5, namely, when the average angle of the outward normal lines is greater than the average angle of the inward normal lines, the high effect to improve the light use efficiency is obtained. Particularly, the highest effect is obtained when (average angle of outward normal lines)/(average angle of outward normal lines+average angle of inward normal lines) is around 0.7.

Figure 12:
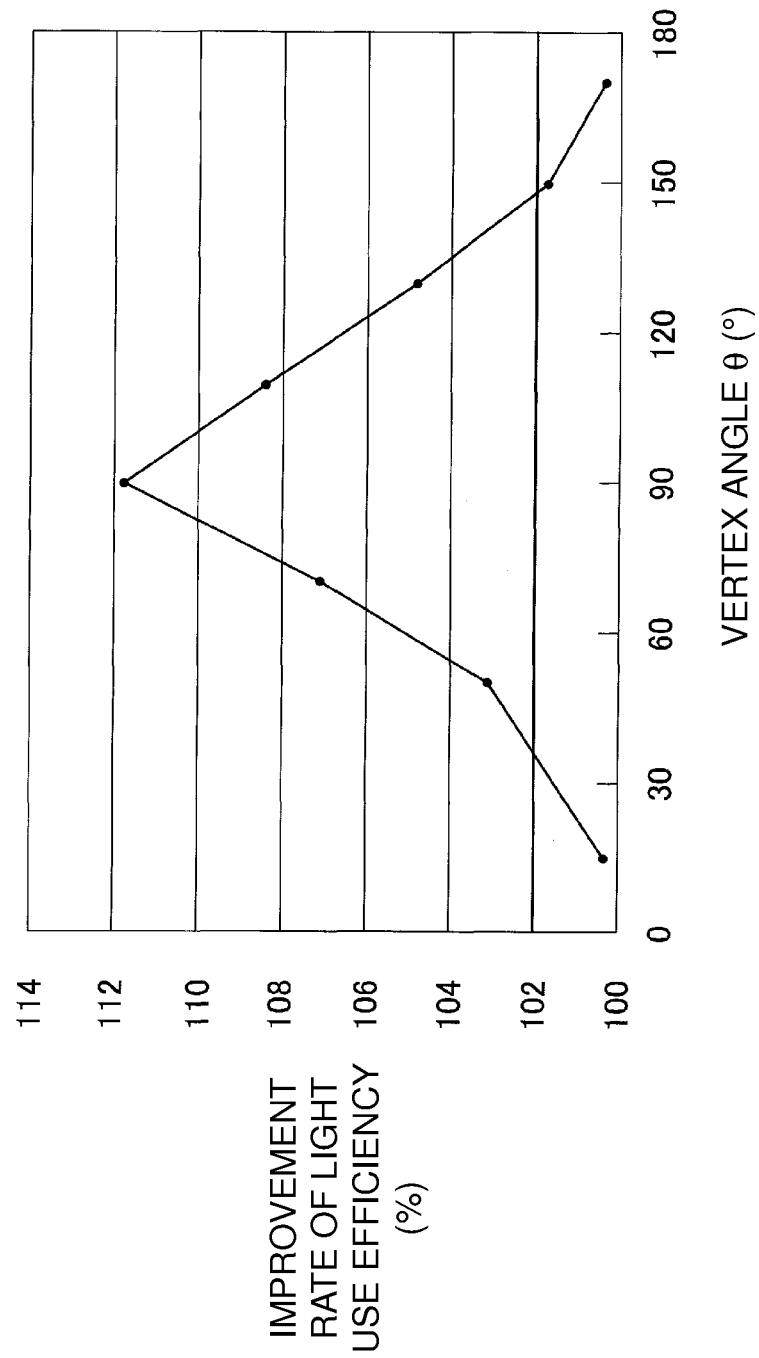
FIG. 12 is a view illustrating a relationship between a vertex angle θ of the directivity conversion pattern and the improvement rate of light use efficiency of the light guide plate.

Desirably, the vertex angle θ (see FIG. 6) formed by the pattern elements 40a adjacent to each other in the directivity conversion pattern 40 ranges from 50° to 140°. FIG. 12 illustrates a simulation result showing this reason. Referring to FIG. 12, how much the light use efficiency changes is examined when the vertex angle is changed in the range of 15° to 170° in the directivity conversion pattern 40 having the shape in FIG. 6. In FIG. 12, a horizontal axis indicates the vertex angle θ of the directivity conversion pattern 40, and a vertical axis indicates an improvement rate of light use efficiency. The improvement rate of light use efficiency indicates a ratio of the light output from the light exit surface 39 in the light incident from the light incident surface 38, and the improvement rate of light use efficiency is expressed based on the light use efficiency (100%) of the conventional example in FIG. 1. As can be seen from FIG. 12, the effect to improve the light use efficiency is recognized in the substantially whole region where the vertex angle θ of the directivity conversion pattern 40 is less than or equal to 180°, and the highest effect is obtained at the vertex angle θ of 90°. Particularly, the directivity conversion pattern 40 is of practical value because the effect to improve the light use efficiency is obtained by at least 2% when the vertex angle θ ranges from 50° to 140°. Therefore, the vertex angle θ of the directivity conversion pattern 40 desirably ranges from 50° to 140°.

Figure 13:
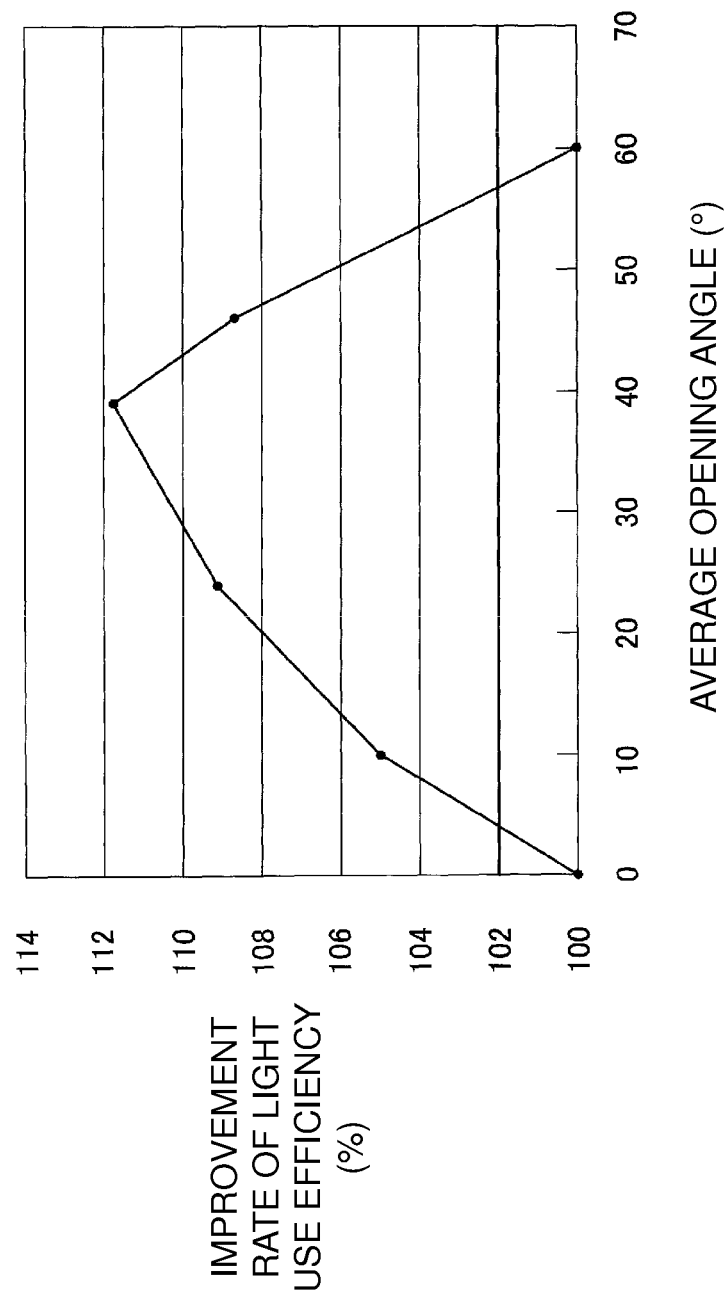
FIG. 13 is a view illustrating a relationship between an average opening angle of the directivity conversion pattern and the improvement rate of light use efficiency.

FIG. 13 illustrates a simulation result of a relationship between an average opening angle of the directivity conversion pattern 40 having the shape in FIG. 6 and the improvement rate of light use efficiency. As illustrated in FIG. 14, the average opening angle of the directivity conversion pattern 40 is obtained by an arithmetic average of inclinations $\phi_1, \phi_2, \phi_3, \ldots$, each of which is formed by the extending direction of the pattern elements 40a and the optical axis C in the right or left region when the directivity conversion pattern 40 viewed in the direction perpendicular to the light exit surface 39 of the light guide plate 33 is divided into the right and left regions with respect to the optical axis C. As can be seen from FIG. 13, in both the right and left regions of the optical axis C, the effect to improve the light use efficiency is obtained when the average opening angle of the directivity conversion pattern 40 is less than or equal to 60°. Particularly, the directivity conversion pattern 40 is of practical value, because the improvement rate of light use efficiency is obtained by at least 2% when the average opening angle ranges from 5° to 55°. Therefore, the average opening angle of the directivity conversion pattern 40 desirably ranges from 5° to 55°.

Figure 15A:
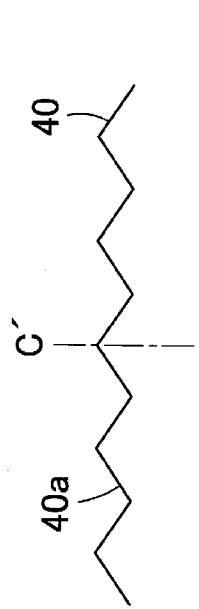
FIGS. 15A to 15E are sectional views illustrating shapes in a section parallel to the light incident surface in each of different directivity conversion patterns.
Figure 15C:
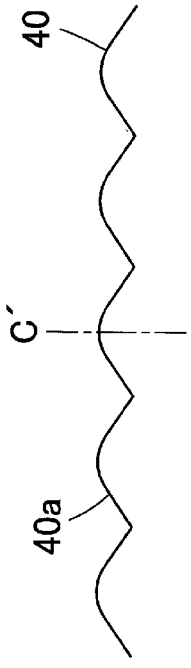
Figure 15B:
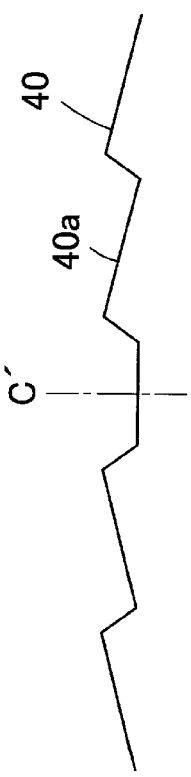
Figure 15D:
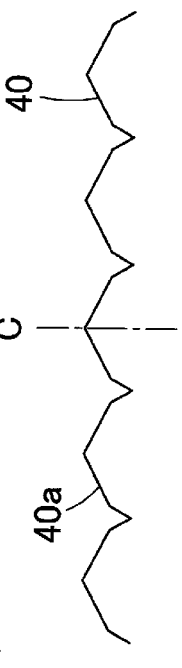
Figure 15E:
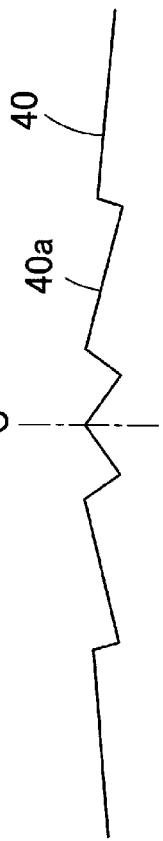

It is only necessary to obliquely dispose the directivity conversion pattern 40 on both the sides of the optical axis C. Therefore, there is no particular limitation to the cross sectional shape of the directivity conversion pattern 40. For example, as illustrated in FIG. 15A, the pattern elements 40a having asymmetric sectional shapes may repeatedly be arranged in the right and left regions. In FIG. 15B, the pattern elements 40a having asymmetric sectional shapes are arranged in the right and left regions while gradually deformed. As illustrated in FIG. 15C, the pattern elements 40a having symmetric V-groove sectional shapes may repeatedly be arranged. A vertex portion of the directivity conversion pattern 40 may be curved as illustrated in FIG. 15D, or the pattern elements 40a having polygonal sectional shapes may be arranged as illustrated in FIG. 15E.

Figure 16A:
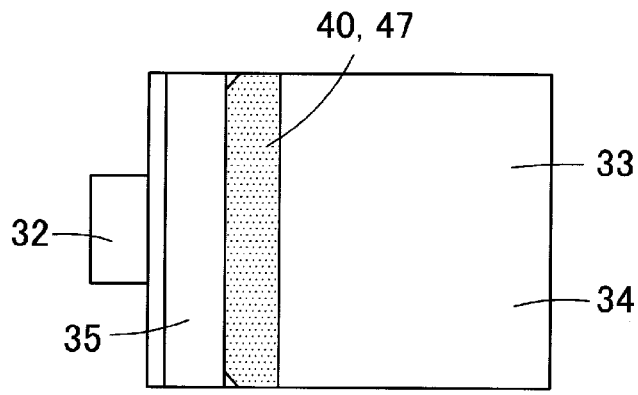
FIGS. 16A to 16D are schematic diagrams illustrating various shapes of pattern forming regions in each of which the directivity conversion pattern is formed.
Figure 16B:
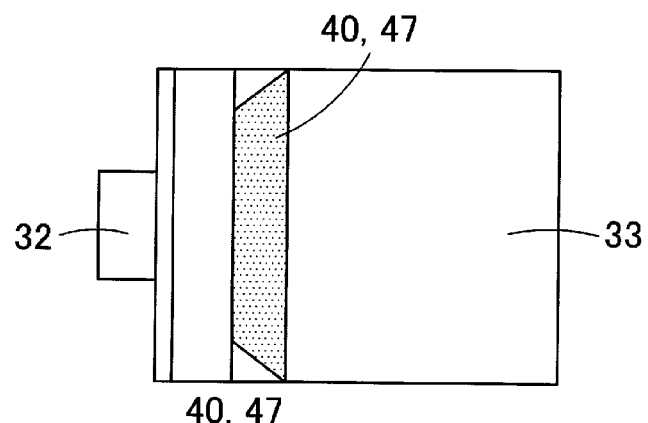
Figure 16C:
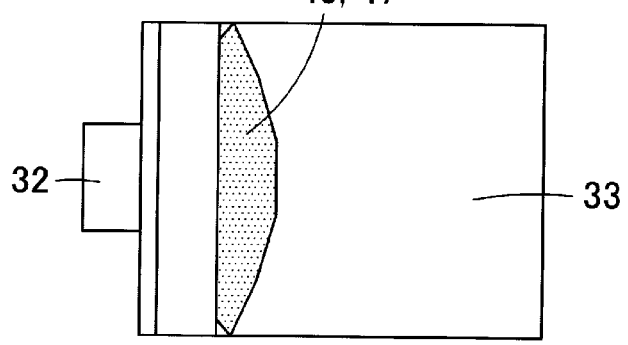
Figure 16D:
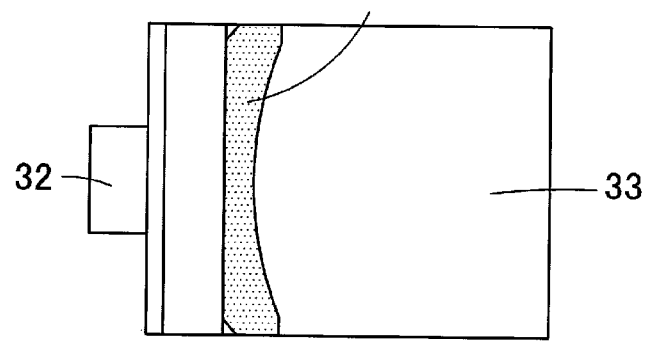

There are various shapes of the region (the pattern forming region 47) where the directivity conversion pattern 40 is provided. For example, as illustrated in FIG. 16A, the directivity conversion pattern 40 may not be provided at a corner on the point light source side where the light of the point light source 32 hardly reaches. As illustrated in FIG. 16B, at the corner on the point light source side, the region where the directivity conversion pattern 40 does not exist may be enlarged to form the trapezoidal pattern forming region 47. In FIG. 16C, in the pattern forming region 47, an edge located on the opposite side of the point light source 32 is projected to the opposite side of the point light source 32. As illustrated in FIG. 16D, in the pattern forming region 47, the edge located on the opposite side of the point light source 32 may be recessed to the point light source side.

(Modifications)

Figure 17:
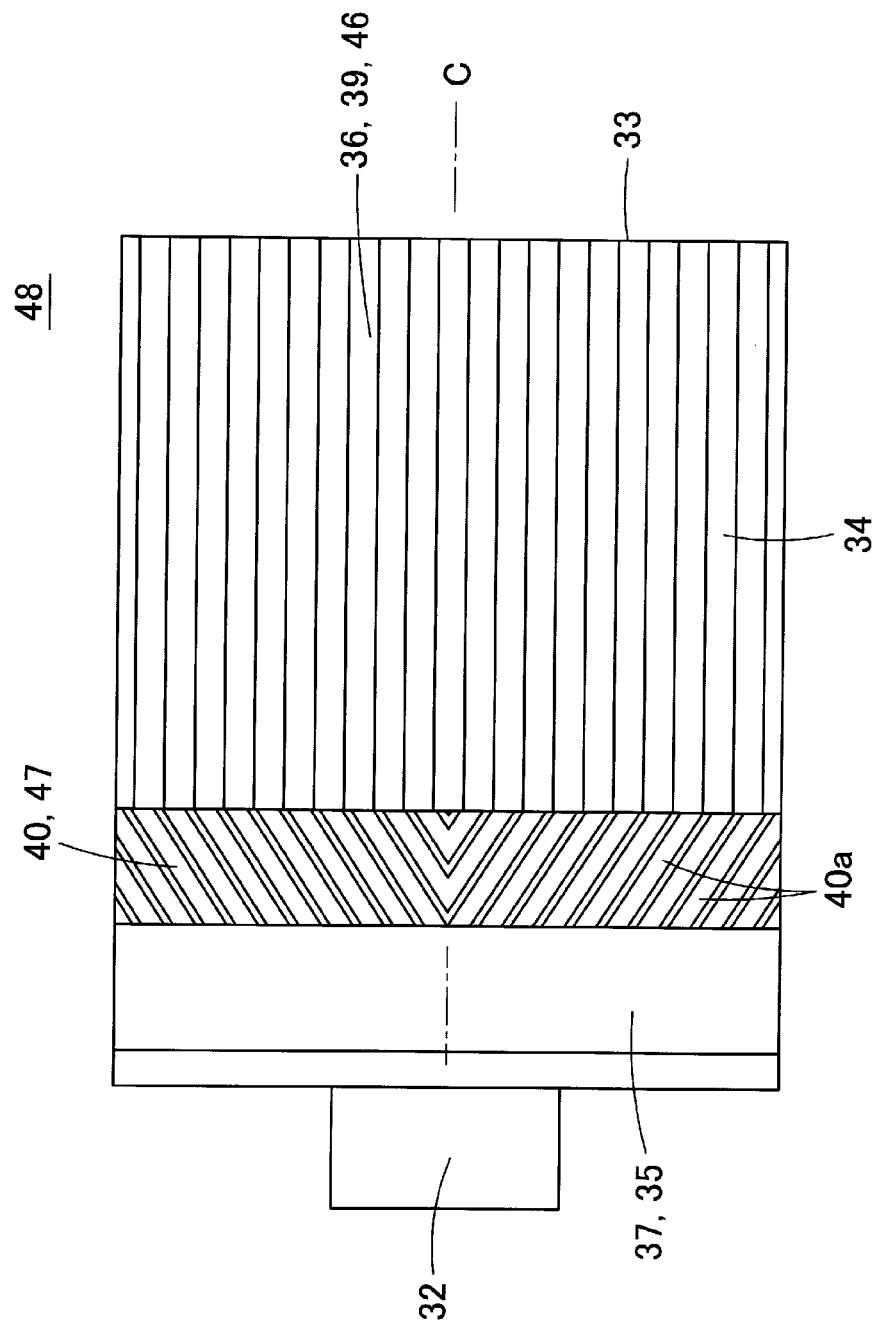
FIG. 17 is a plan view illustrating a surface light source device according to a modification of the first embodiment of the present invention.

FIG. 17 is a plan view illustrating a surface light source device 48 according to a modification of the first embodiment of the present invention. The pattern elements 40a of the directivity conversion pattern 40 may be parallel to one another on both the sides of the optical axis C of the point light source 32. That is, in a surface light source device 48, the pattern elements 40a of the directivity conversion pattern 40 are inclined so as to be oppositely oriented with respect to the optical axis C on both the sides of the optical axis C of the point light source 32. The pattern elements 40a are parallel to one another in a right half of the optical axis C, and the pattern elements 40a are parallel to one another in a left half.

Even if the pattern elements 40a are parallel to one another, the leakage of the light can be reduced because the directional pattern of the light reflected by the directivity conversion pattern 40 can be converted to the direction parallel to the optical axis C. When the pattern elements 40a are parallel to one another, the directivity conversion pattern 40 is easily produced. Particularly, a molding die is easily produced when a reversal pattern for molding the directivity conversion pattern 40 is formed in the molding die by cutting.

Figure 18:
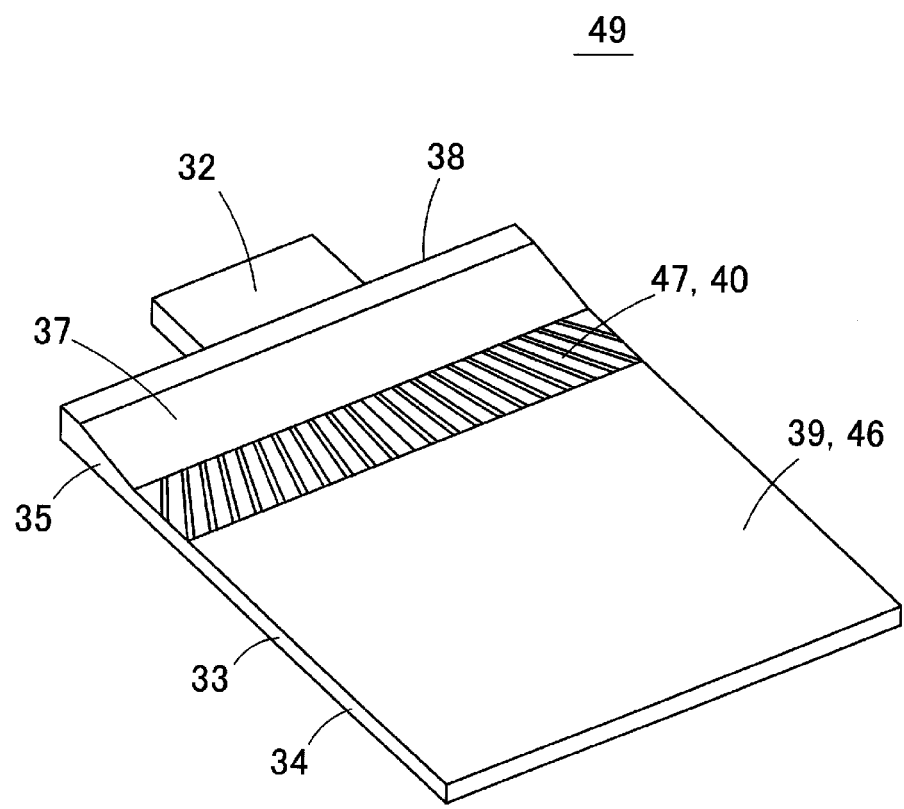
FIG. 18 is a perspective view illustrating a surface light source device according to another modification of the first embodiment of the present invention.

FIG. 18 is a perspective view illustrating a surface light source device 49 according to another modification of the first embodiment of the present invention. As in the surface light source device 49, the lenticular lens 36 may be eliminated, and the light exit surface 39 of the effective lighting region 46 may be smooth. Even if the lenticular lens 36 is eliminated, the leakage of the light from the side surface can be advantageously reduced.

Second Embodiment

Figure 19:
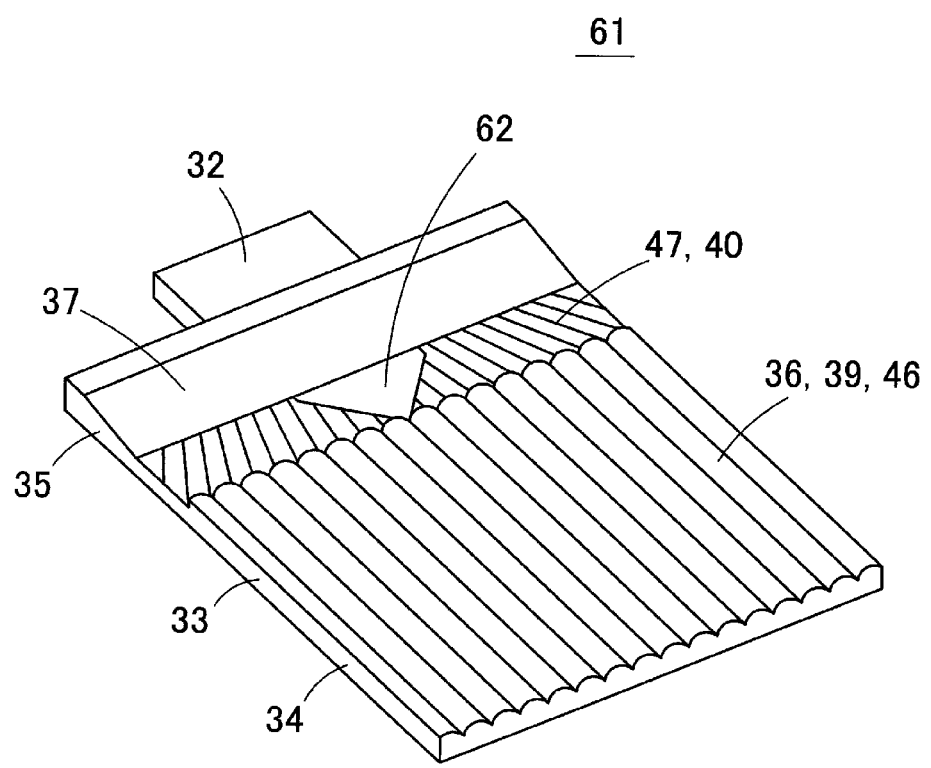
FIG. 19 is a perspective view illustrating a surface light source device according to a second embodiment of the present invention.
Figure 20:
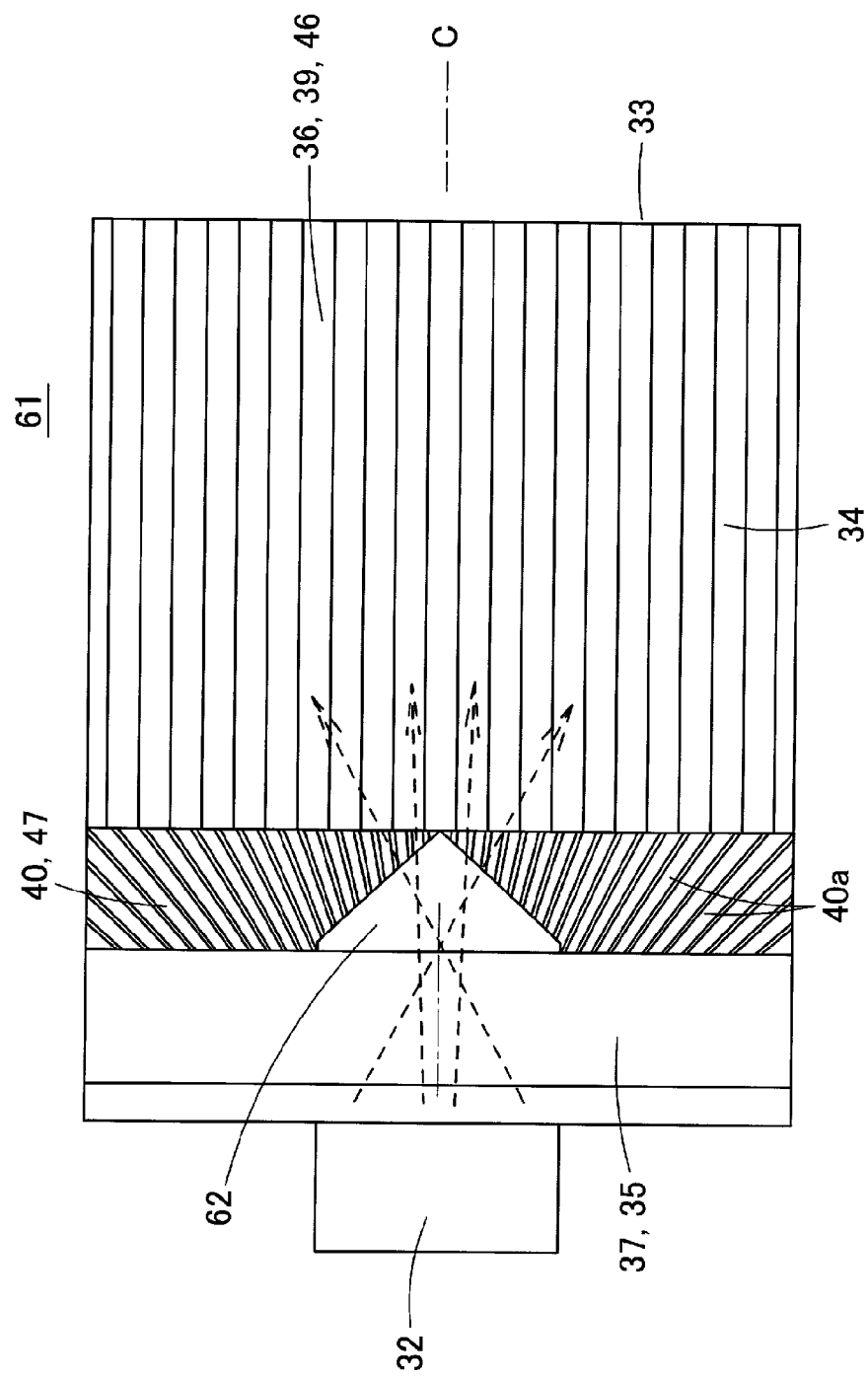
FIG. 20 is a plan view of the surface light source device in FIG. 19.
Figure 21:
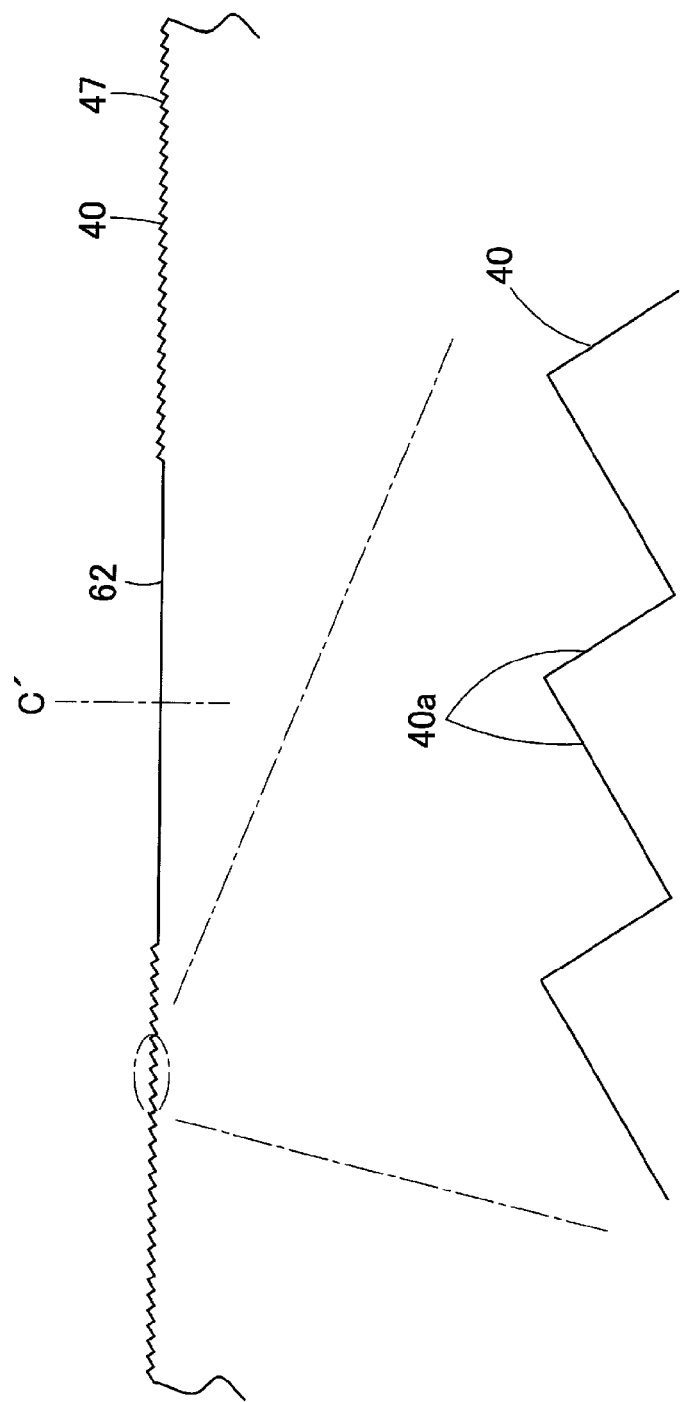
FIG. 21 is a sectional view illustrating a shape of a directivity conversion pattern in a section parallel to a light incident surface and a part thereof in an enlarged form.

FIG. 19 is a perspective view illustrating a surface light source device 61 according to a second embodiment of the present invention. FIG. 20 is a plan view of the surface light source device 61. FIG. 21 illustrates a cross sectional shape of the directivity conversion pattern 40 in the cross section parallel to the light incident surface 38. FIG. 21 also illustrates a part of the directivity conversion pattern 40 in an enlarged form.

In the surface light source device 61 of the second embodiment, the directivity conversion pattern 40 is partially removed to form a flat surface 62 in proximity to the optical axis C of the point light source 32. Particularly, in the example in FIGS. 19 and 20, the triangular flat surface 62 is provided so as to be sandwiched between the right and left directivity conversion patterns 40.

According to the structure of the second embodiment, the leakage of the light from the side surface of the light guide plate 33 or the lenticular lens 36 can be reduced by the directivity conversion patterns 40 located on both the sides. Additionally, since the directivity conversion pattern 40 is partially removed in front of the point light source 32, the amount of light sent to the front of the point light source 32 can be increased as indicated by broken lines in FIG. 20. The light is laterally spread by the directivity conversion pattern 40 to decrease the amount of light sent to the front of the point light source 32, which allows prevention of darkness in a portion located in front of the point light source 32.

Figure 22A:
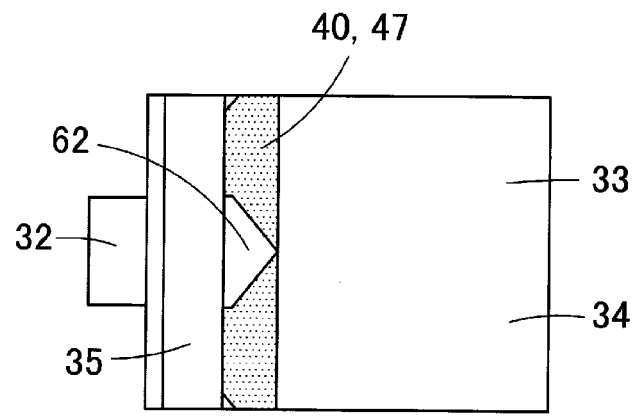
FIGS. 22A to 22C are schematic diagrams illustrating various shapes of pattern forming regions in each of which the directivity conversion pattern is formed.
Figure 22B:
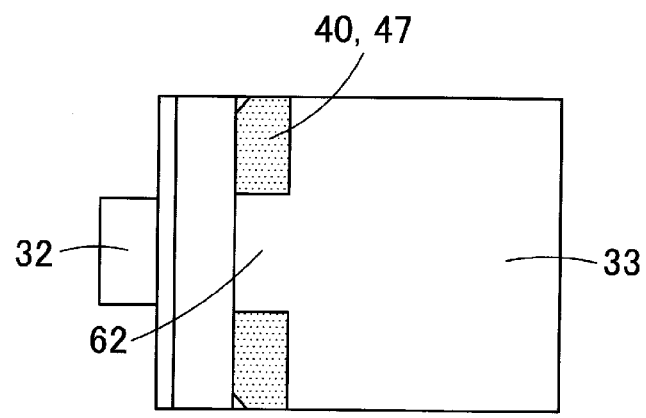
Figure 22C:
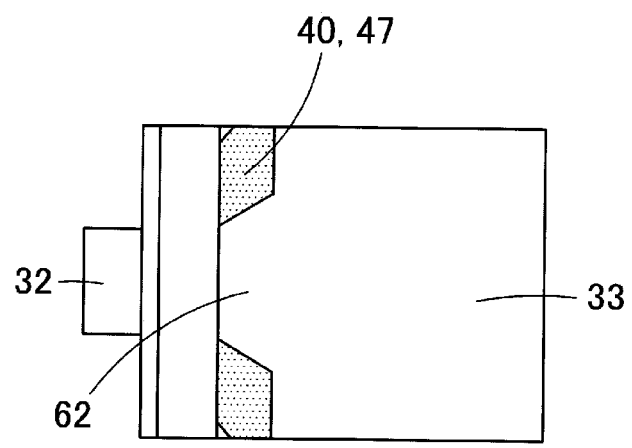

A shape of the portion in which the directivity conversion pattern 40 is removed (the flat surface 62) is not limited to the triangular shape as illustrated in FIGS. 19 and 20. For example, the pentagonal directivity conversion pattern 40 may be removed as illustrated in FIG. 22A, the rectangular directivity conversion pattern 40 may be removed as illustrated in FIG. 22B, and the trapezoidal directivity conversion pattern 40 may be removed as illustrated in FIG. 22C.

Third Embodiment

Figure 23:
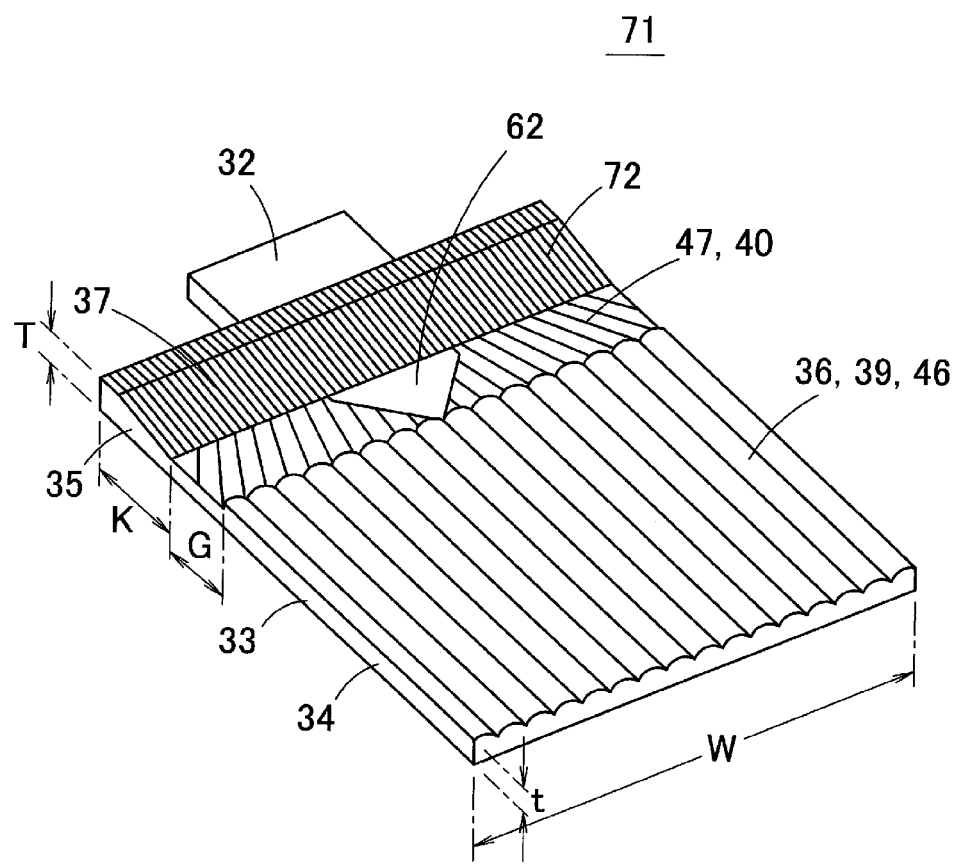
FIG. 23 is a perspective view illustrating a surface light source device according to a third embodiment of the present invention.
Figures 24A, 24B:
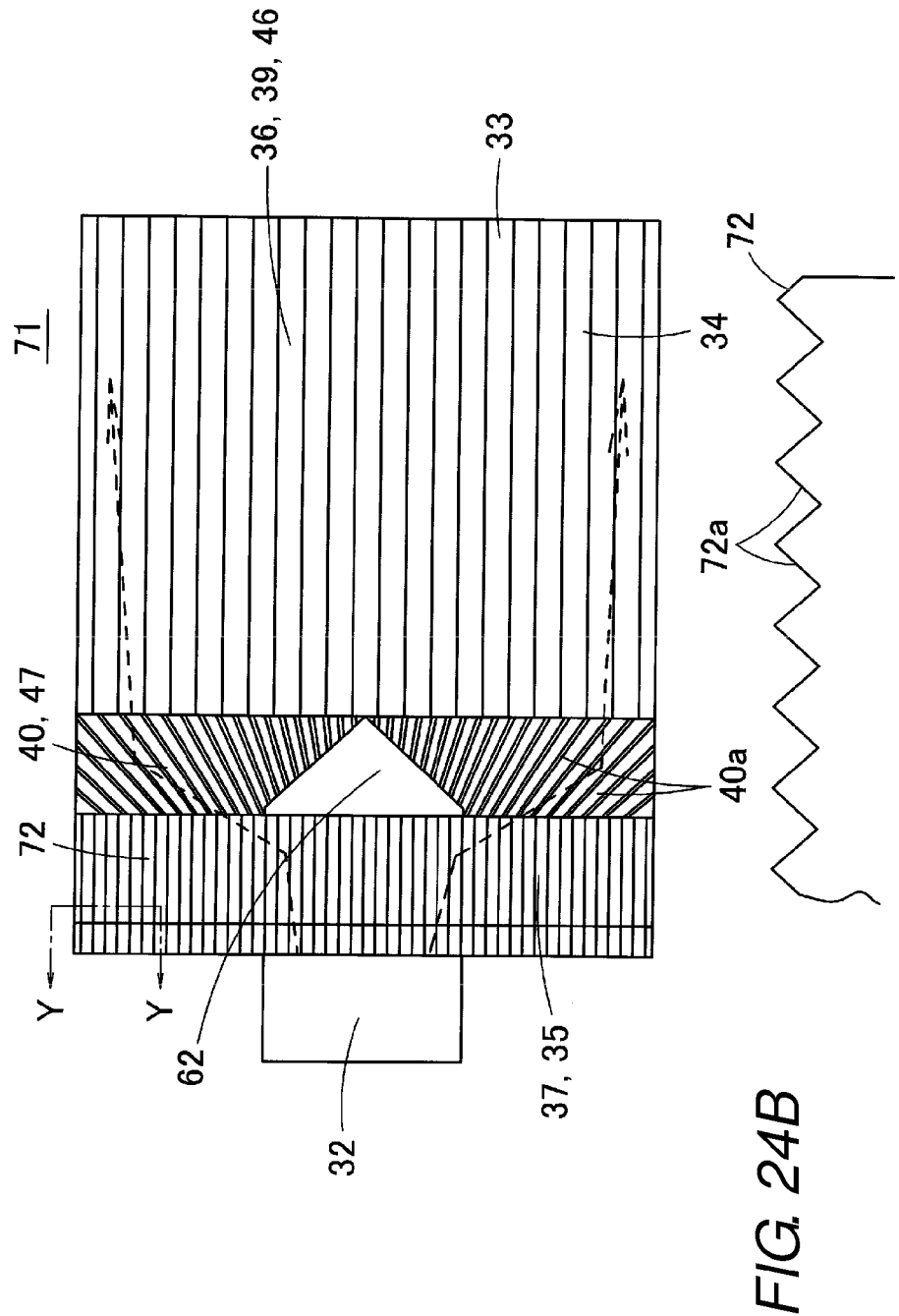
FIG. 24A is a plan view of the surface light source device in FIG. 23.
FIG. 24B is a sectional view taken along line Y-Y in FIG. 24A, and illustrates a cross sectional shape of a light diffusion pattern.

FIG. 23 is a perspective view illustrating a surface light source device 71 according to a third embodiment of the present invention. FIG. 24A is a plan view of the surface light source device 71. FIG. 24B is a sectional view taken along line Y-Y in FIG. 24A.

In the surface light source device 71 of the third embodiment, a light diffusion pattern 72, which laterally spreads the directivity of the reflected light, is formed in the upper surface and/or the lower surface of the light introduction part 35. As illustrated in FIG. 24B, the light diffusion pattern 72 may be formed by arranging vertically extending V-grooves 72a in parallel with one another, or the light diffusion pattern 72 may be a pattern having a lenticular-lens shape or a random shape. In the structure of the third embodiment, the light is sent to the side surface direction of the light guide plate 33 while being laterally spread by the light diffusion pattern 72, thereby preventing darkening of a side edge portion of the light exit surface 39. Additionally, the directional pattern of the light sent to the side surface direction is converted to the direction parallel to the optical axis C by the directivity conversion pattern 40, so that the light hardly leaks from the side surface of the light guide plate 33 or the lenticular lens 36. Additionally, the flat surface 62 having no directivity conversion pattern 40 is formed in front of the point light source 32 to prevent darkening in front of the point light source 32.

When the light diffusion pattern 72 is constructed by the V-grooves 72a, the light hardly leaks from the inclined surface 37 or the light introduction part 35, and the light, which is emitted from the point light source 32 and incident to the light introduction part 35, can be introduced to the light guide plate body 34 at a low loss.

In the surface light source device 71 of the third embodiment, the ratio of the amount of light leaking from the light guide plate 33 was 5%, when a sample was produced while dimensions of each part in FIG. 23 were set as follows.

width of light exit window of point light source 32: 2 mm
width W of light guide plate 33: 5.5 mm
maximum thickness T of light introduction part 35: 0.42 mm
length K of light introduction part 35: 1.5 mm
thickness t of light guide plate body 34: 0.23 mm
length G of pattern forming region 47: 1.5 mm
refractive index n of light guide plate 33: 1.59

On the other hand, the ratio of the amount of leakage light was 15%, when the surface light source device of the conventional example in FIG. 1 was produced on the same condition while the directivity conversion pattern 40 and the light diffusion pattern 72 are removed. Therefore, in the surface light source device of the third embodiment, the ratio of the leakage light can be reduced to ⅓ of the conventional example.

(Modification)

Figure 25:
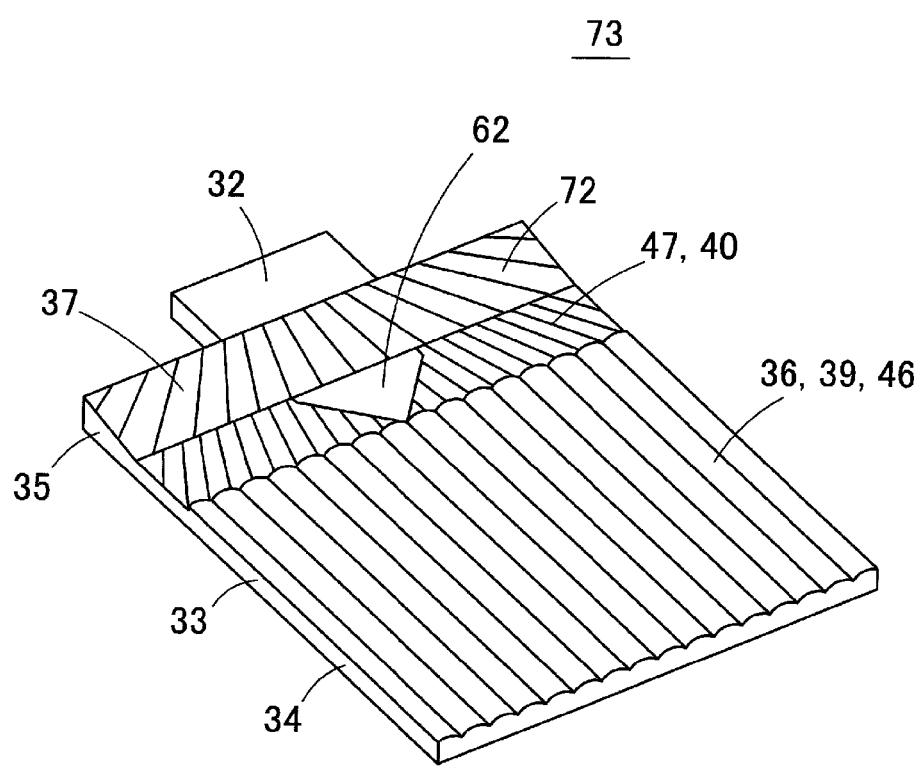
FIG. 25 is a perspective view illustrating a surface light source device according to a modification of the third embodiment of the present invention.

FIG. 25 is a perspective view illustrating a surface light source device 73 according to a modification of the third embodiment of the present invention. In the surface light source device 73, the light diffusion pattern 72 which laterally spreads the light is radially formed.

Fourth Embodiment

Figure 26:
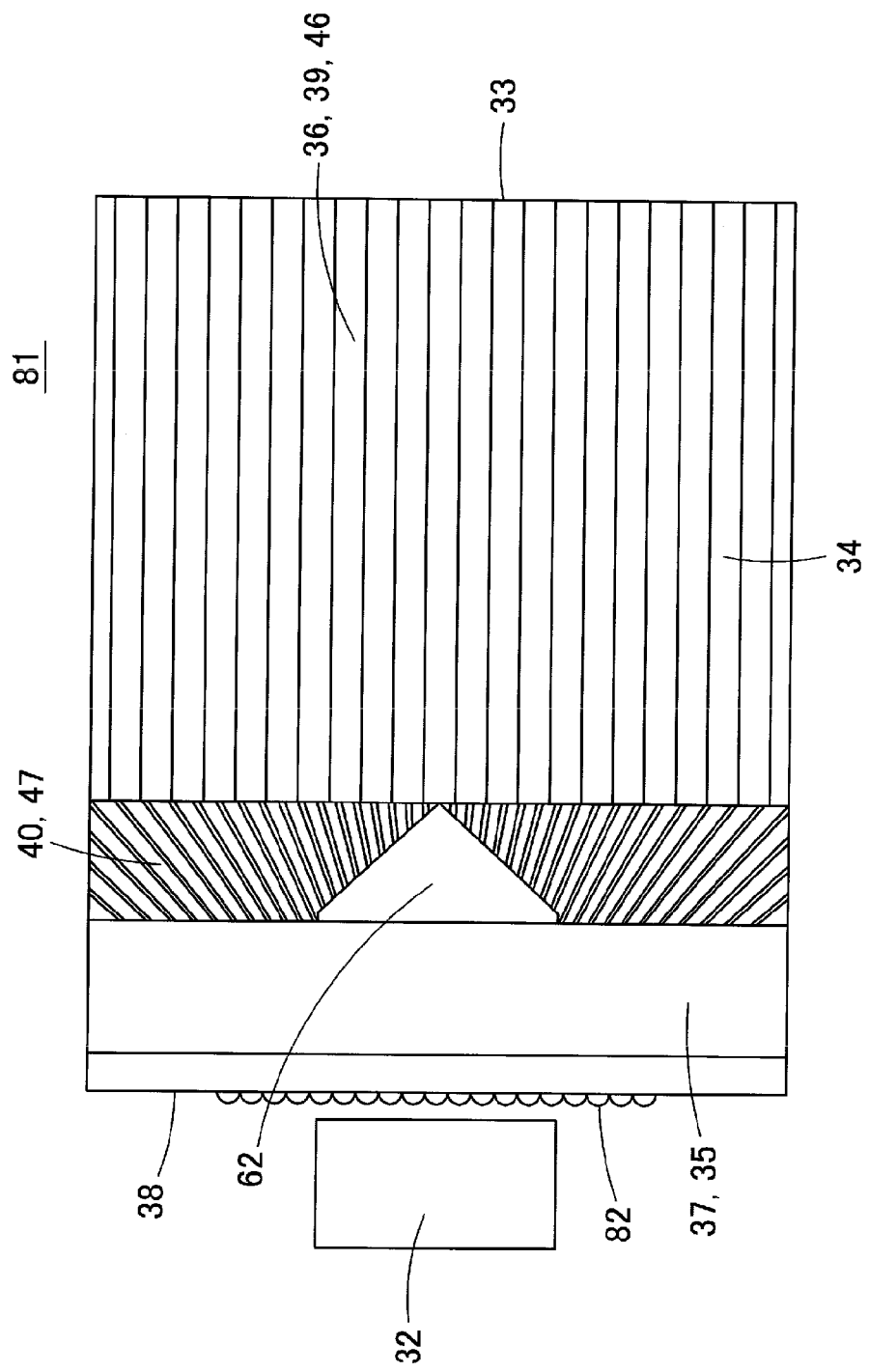
FIG. 26 is a plan view illustrating a surface light source device according to a fourth embodiment of the present invention.
Figure 27:
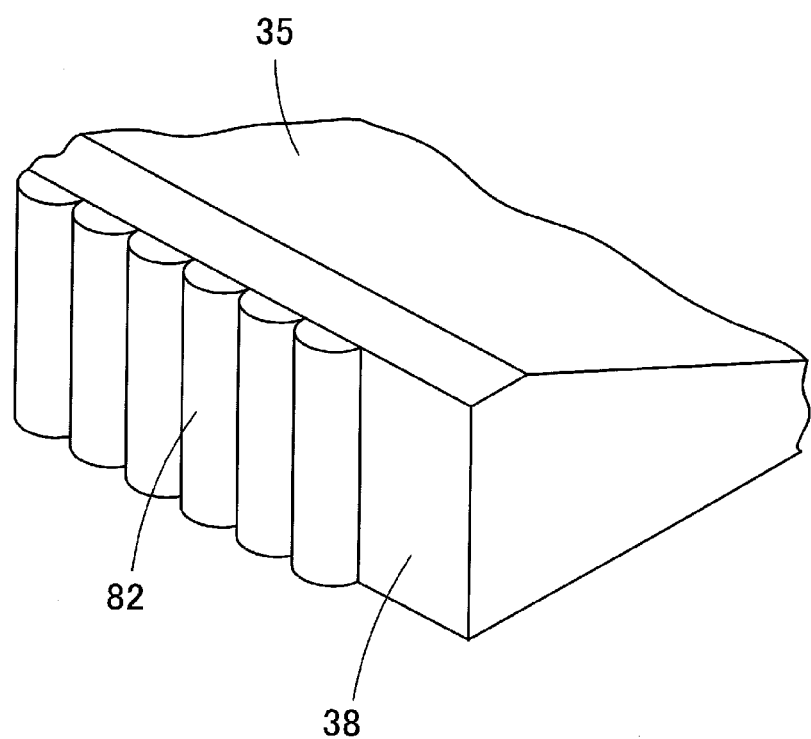
FIG. 27 is an enlarged perspective view illustrating a part of a light introduction part in the surface light source device in FIG. 26 in an enlarged form.

FIG. 26 is a plan view illustrating a surface light source device 81 according to a fourth embodiment of the present invention. FIG. 27 is a perspective view illustrating a part of the light introduction part 35 in the surface light source device 81 in an enlarged form.

In the surface light source device 81 of the fourth embodiment, a light diffusion pattern 82 which laterally spreads the light is provided in at least a region facing the point light source 32 in the light incident surface 38 of the light introduction part 35. As illustrated in FIG. 27, the light diffusion pattern 82 may be formed into a cylindrical-lens shape in which convex lenses extending in the height direction are laterally arranged, the light diffusion pattern 82 may be constructed by arranging the V-grooves extending in the height direction in parallel with one another, or the light diffusion pattern 82 may be a pattern having a random shape.

In the surface light source device 81 having the above structure, the light is sent to the side surface direction of the light guide plate 33 while being laterally spread by the light diffusion pattern 82, thereby preventing darkening of the side edge portion of the light exit surface 39. Additionally, the directional pattern of the light sent to the side surface direction is converted to the direction parallel to the optical axis C by the directivity conversion pattern 40, whereby the light hardly leaks from the side surface of the light guide plate 33 or the lenticular lens 36. Additionally, the flat surface 62 having no directivity conversion pattern 40 is formed in front of the point light source 32 so that darkening in front of the point light source 32 is prevented.

Fifth Embodiment

Figure 28:
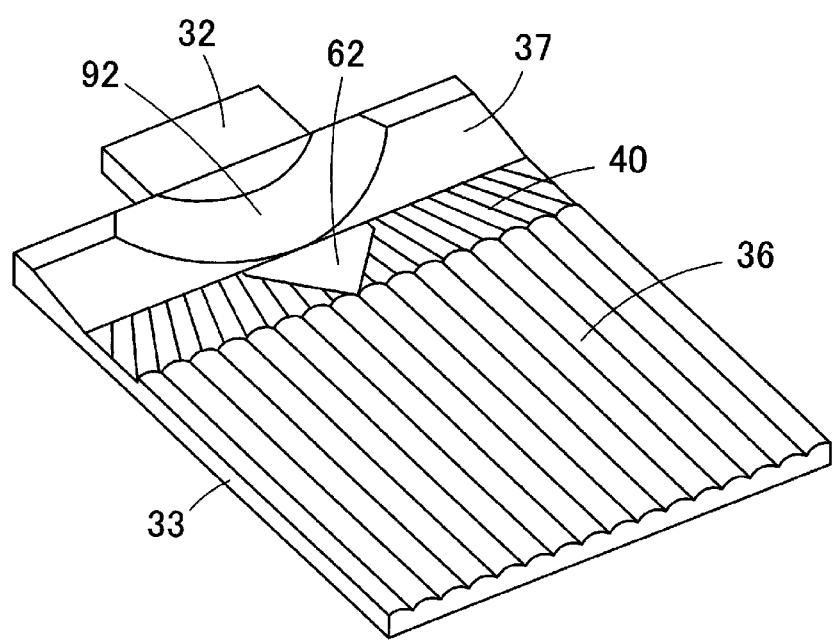
FIG. 28 is a perspective view illustrating a surface light source device according to a fifth embodiment of the present invention.

FIG. 28 is a perspective view illustrating a surface light source device 91 according to a fifth embodiment of the present invention.

In the surface light source device 91, in front of the point light source 32, a projection part 92 is formed in the inclined surface 37 of the light introduction part 35. The projection part 92 has the same shape as a part of a truncated cone. In the case where the projection part 92 is provided in the inclined surface 37, the point light source 32 is surrounded by an outer peripheral surface (inclined surface) of the projection part 92 in a substantial arc when the light guide plate 33 is viewed from above. Therefore, the light, which is emitted from the point light source 32 and enters the light introduction part 35 from the light incident surface 38, is substantially perpendicularly incident to the outer peripheral surface of the projection part 92. As a result, the light hardly leaks from the inclined surface (the outer peripheral surface of the projection part 92) of the light introduction part 35, and efficiency of the light guide from the light introduction part 35 to the light guide plate body 34 is improved.

(Modification)

Figure 29:
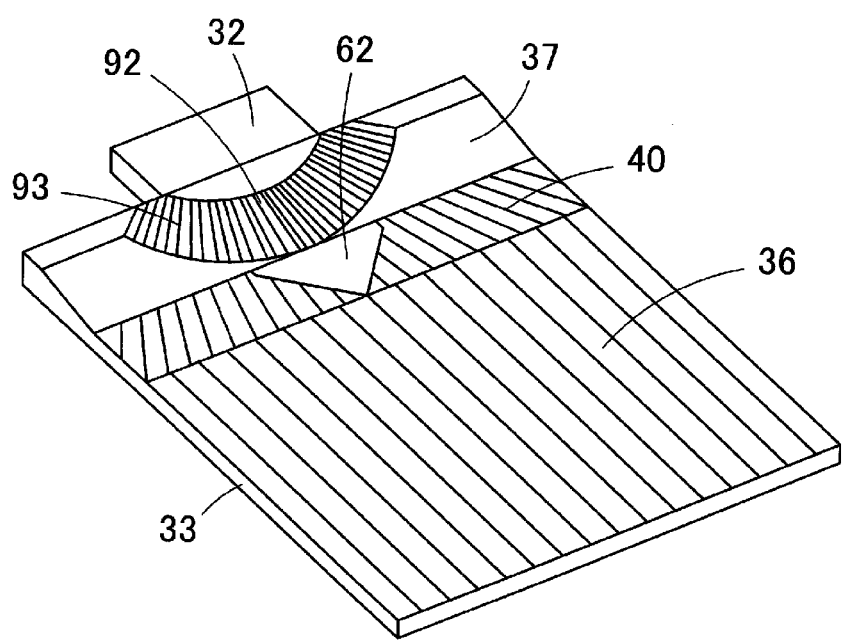
FIG. 29 is a perspective view illustrating a surface light source device according to a modification of the fifth embodiment of the present invention.

In the surface light source device of the fifth embodiment, as illustrated in FIG. 29, a light diffusion pattern 93 which laterally spreads the light may be provided in the outer peripheral surface of the projection part 92.

(Various Modes of Light Guide Plate)

FIGS. 30A to 30C, 31A to 31C, 32A to 32C, and 33A to 33C are schematic side views illustrating various shapes of the light guide plates 33. The effect of the prevent invention can be obtained when these light guide plates are used.

Figure 30A:
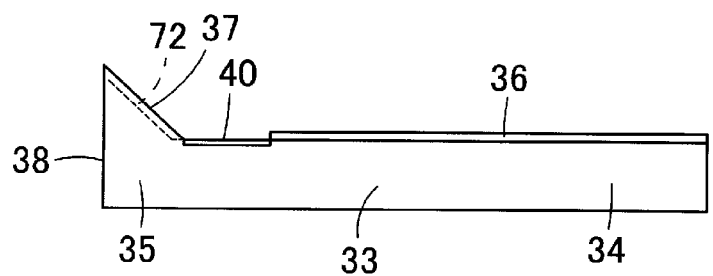
FIGS. 30A to 30C are schematic side views illustrating various modes of light guide plates.
Figure 30B:
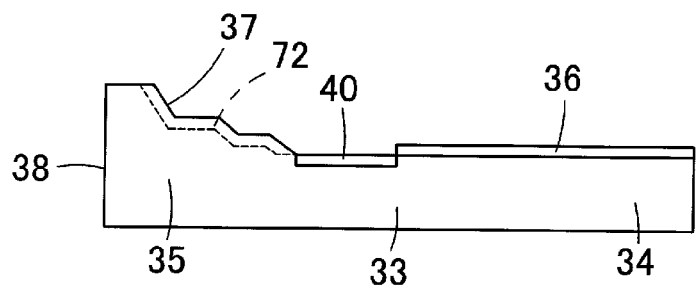
Figure 30C:
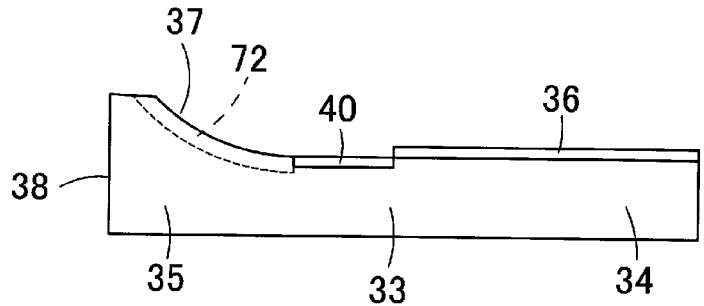

In the light guide plate in FIG. 30A, a horizontal portion at an end of the light introduction part 35 is eliminated, and the inclined surface 37 is started from the light incident surface 38. In the light guide plate in FIG. 30B, the inclined surfaces 37 of the light introduction part 35 are provided at a plurality of stages. In the light guide plate in FIG. 30C, the inclined surface 37 of the light introduction part 35 is formed into a curved shape.

Figure 31A:
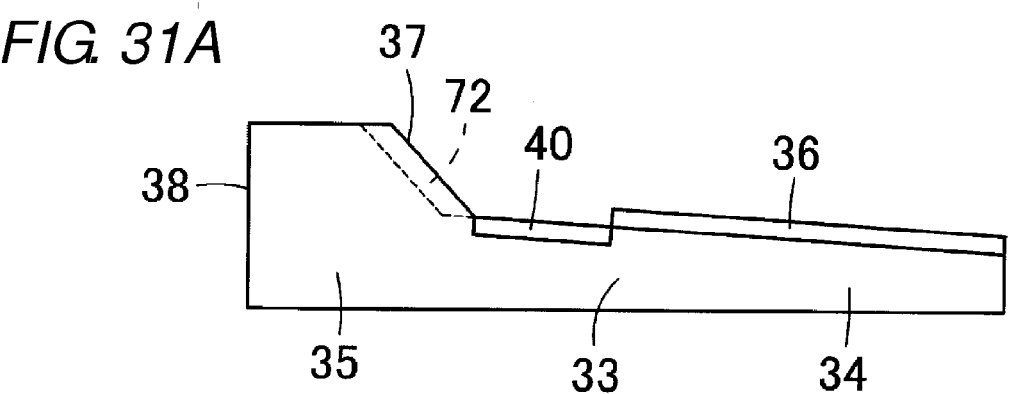
FIGS. 31A to 31C are schematic side views illustrating various modes of light guide plates.
Figure 31B:
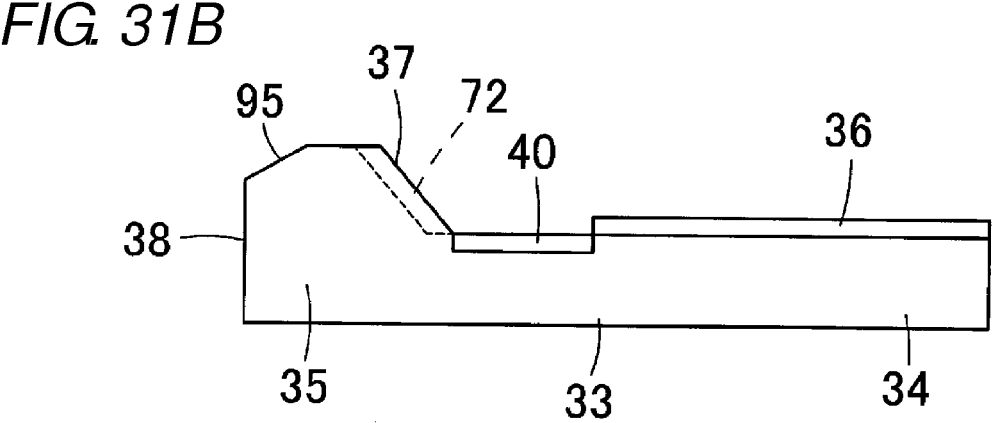
Figure 31C:
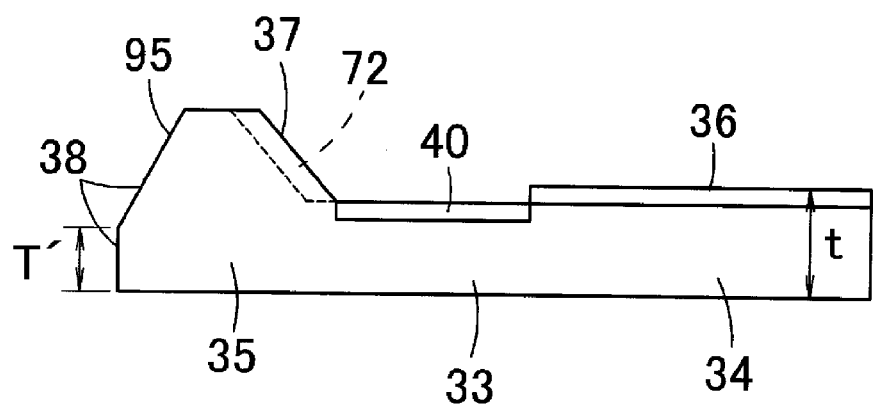

In the light guide plate in FIG. 31A, the upper surface of the light guide plate body 34 is inclined to form the tapered light guide plate body 34. In the light guide plates in FIGS. 31B and 31C, the end on the side of the light incident surface 38 in the upper surface of the light introduction part 35 is inclined toward the opposite direction of the inclined surface 37 to form an inversely inclined part 95. Particularly, in FIG. 31C, the inversely inclined part 95 is provided, whereby a height T' at the end of the light introduction part 35 is smaller than a thickness t of the light guide plate body 34.

Figure 32A:
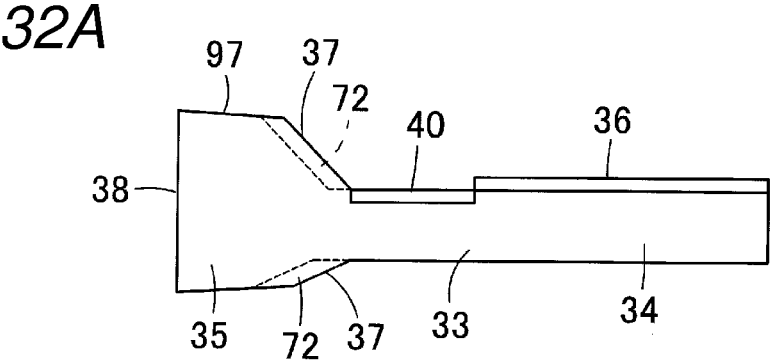
FIGS. 32A to 32C are schematic side views illustrating various modes of light guide plates.
Figure 32B:
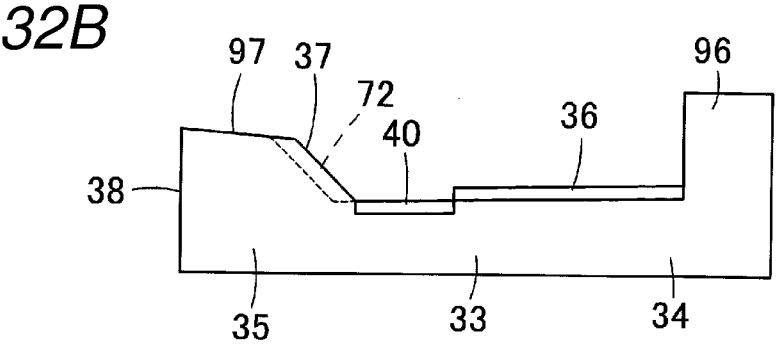

In the light guide plate in FIG. 32A, the inclined surfaces 37 are provided in the upper and lower surfaces of the light introduction part 35, and the light diffusion pattern 72 is provided in one or both of the inclined surfaces 37. As illustrated in FIG. 32B, a portion 96 thicker than the light introduction part 35 may be provided in a part of the light guide plate body 34.

As illustrated in FIGS. 32A and 27B, a moderately inclined surface 97 may be provided by moderately inclining an uppermost surface of the light introduction part 35.

Figure 32C:
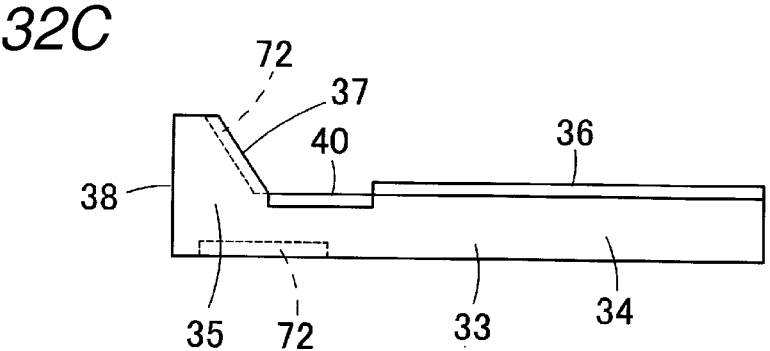
Figure 33A:
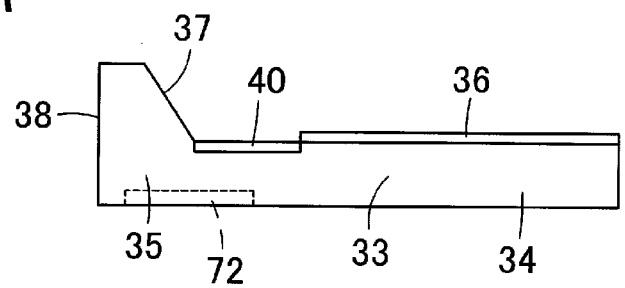
FIGS. 33A to 33C are schematic side views illustrating various modes of light guide plates.

In FIG. 32C, the light diffusion patterns 72 are provided in both the inclined surface 37 and the lower surface of the light introduction part 35. In FIG. 33A, the light diffusion pattern 72 is provided only in the lower surface of the light introduction part 35. As illustrated in FIGS. 32C and 33A, the light diffusion pattern 72 provided in the lower surface of the light introduction part 35 may extend to the lower surface of the light guide plate body 34.

Figure 33B:
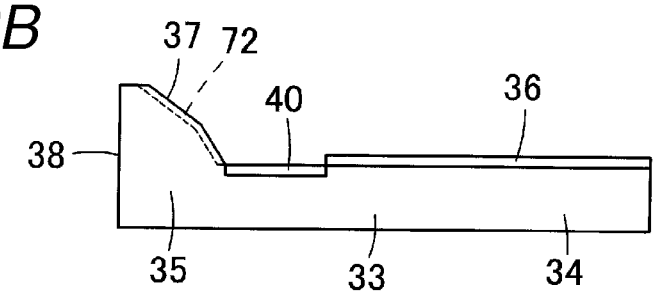
Figure 33C:
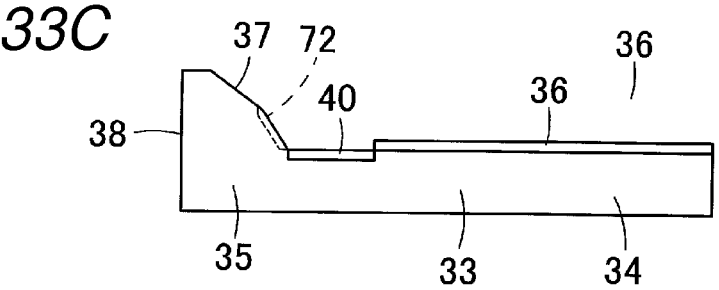

In the light guide plates 33 in FIGS. 33B and 33C, the inclined surface 37 is formed at two stages while the inclination is changed in the middle of the slope. In the light guide plate 33 in FIG. 33B, the light diffusion pattern 72 is provided in the whole inclined surface 37. In the light guide plate 33 in FIG. 33C, the light diffusion pattern 72 is provided only in a lower half of the inclined surface 37.

In the above embodiments and modifications, one light source is used. Alternatively, a plurality of point light sources may be arranged while facing the light incident surface of the light guide plate. In this case, the directivity conversion pattern having the above configuration may repeatedly be provided in the position corresponding to the point light source at the same interval as the point light source.

In the above embodiments and modifications, the directivity conversion pattern is provided in the upper surface of the light guide plate. Alternatively, the directivity conversion pattern may be provided in the lower surface of the light guide plate, or the directivity conversion pattern may be provided in both the upper surface and the lower surface of the light guide plate.

Sixth Embodiment

Figure 34:
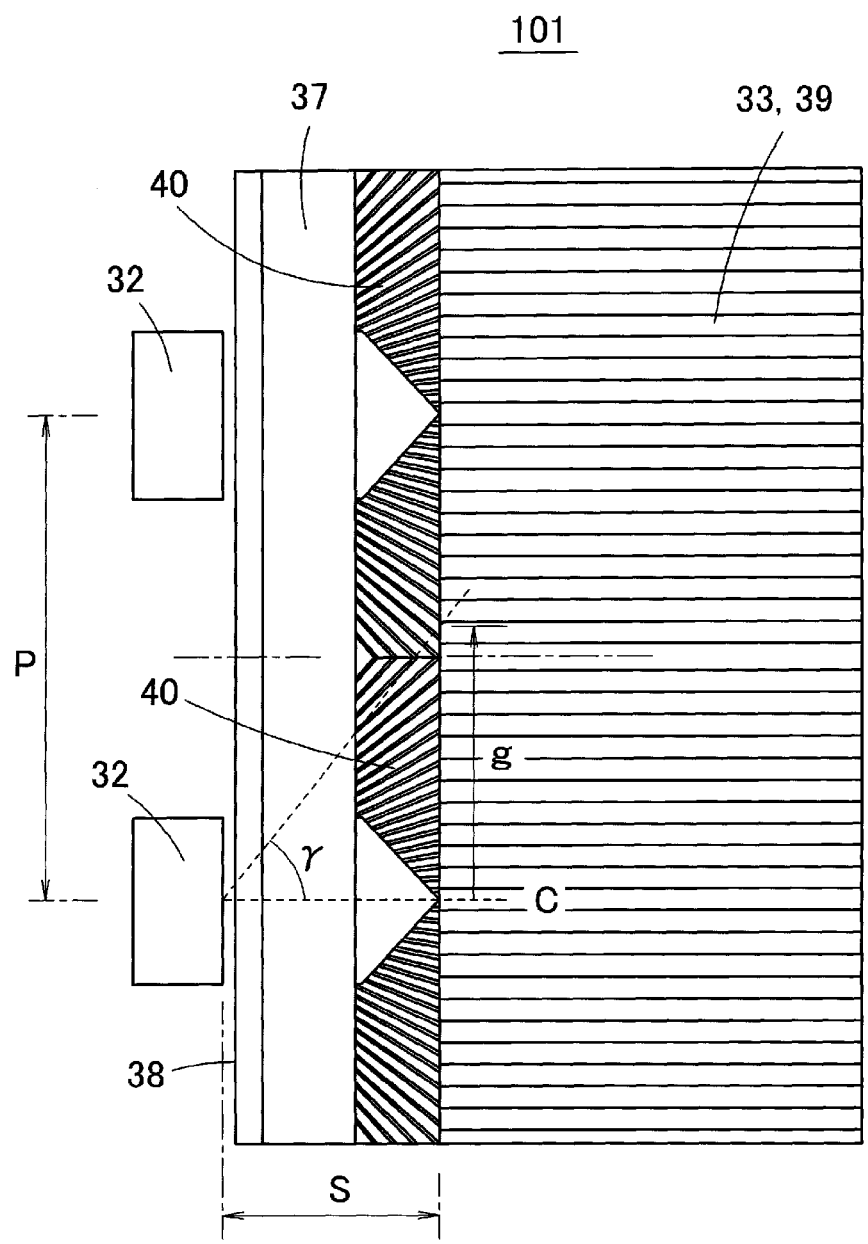
FIG. 34 is a plan view illustrating a surface light source device according to a sixth embodiment of the present invention.

A surface light source device 101 including the plurality of point light sources 32 will be described below. FIG. 34 is a plan view illustrating the surface light source device 101 in which the plurality of point light sources 32 are disposed facing the light incident surface 38 of the light guide plate 33. In the surface light source device 101, the directivity conversion patterns 40 are provided at the same interval as an interval P between the point light sources 32 with the midpoint between the point light sources 32 as a boundary. For example, the point light sources 32 have the interval P of 5.5 mm, and the directivity conversion patterns 40 have the same interval of 5.5 mm.

In the case where the plurality of point light sources 32 are arranged, in the directivity conversion pattern 40, the light may reach the middle portion between the point light sources 32 from the point light sources 32 on both the sides. When the light is simultaneously incident to a certain point of the directivity conversion pattern 40 from the point light sources 32 on both the sides, the directivity conversion pattern 40 cannot be optimally designed such that the leakage of the light is not generated. Therefore, the light use efficiency of the surface light source device is degraded.

Accordingly, the light from the plurality of point light sources 32 is preferably not incident to the directivity conversion pattern 40. According to a Fresnel's law, an incident angle γ of the light, which is emitted from the point light source 32 to enter the light introduction part 35 from the light incident surface 38, is expressed as follows.

$$\gamma = \arcsin(1/n)$$ (Equation 1)

Herein, n is a refractive index of the light guide plate 33. Therefore, as illustrated in FIG. 34, the spread of the light in the light introduction part 35 falls within a range of 2γ around a light source center C. From FIG. 34 and Equation 1, a horizontal spread g of the light in the directivity conversion pattern 40 is expressed as follows.

$$g = S \tan \gamma \approx S \cdot \gamma \approx S \cdot \arcsin(1/n)$$ (Equation 2)

In order that the light guided in the direction of γ from the light source center C does not enter the adjacent region, it is necessary that the horizontal spread g be smaller than ½ of the interval P between the point light sources 32. Therefore, the following expression is obtained.

$$g \leq P/2$$ (Condition 1)

Herein, S is a distance from the end surface (the emission surface) of the point light source 32 to the end of the directivity conversion pattern 40. From Equation 2 and Condition 1, a condition that the light does not reach the directivity conversion pattern 40 from the two directions is obtained as follows.

$$S \leq P/[2 \cdot \arcsin(1/n)]$$ (Condition 2)

Accordingly, in the case where the plurality of point light sources 32 are used, the directivity conversion pattern 40 can optimally be designed when the distance S from the end surface of the point light source 32 to the end of the directivity conversion pattern 40 is determined so as to satisfy the condition of $$S \leq P/[2 - \arcsin(1/n)]$$

and the leakage of the light can be reduced to enhance the light use efficiency. For example, assuming that the interval P between the point light sources 32 is set to 5.5 mm and that the refractive index n of the light guide plate 33 is set to 1.59 (polycarbonate resin), $$J \leq \text{about 4 mm}$$

is obtained, and the length of the region provided with the directivity conversion pattern 40 may be less than or equal to about 4 mm.

Seventh Embodiment

Figure 35A:
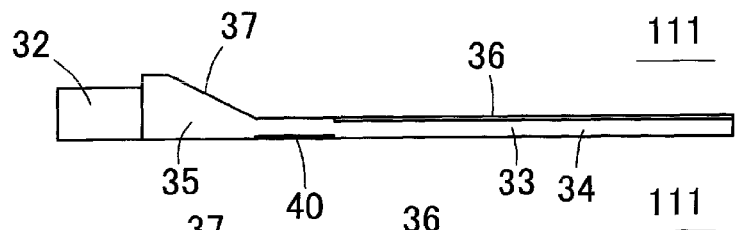
FIGS. 35A, 35B, and 35C are a side view, a plan view, and a bottom view illustrating a surface light source device according to a seventh embodiment of the present invention.
Figure 35B:
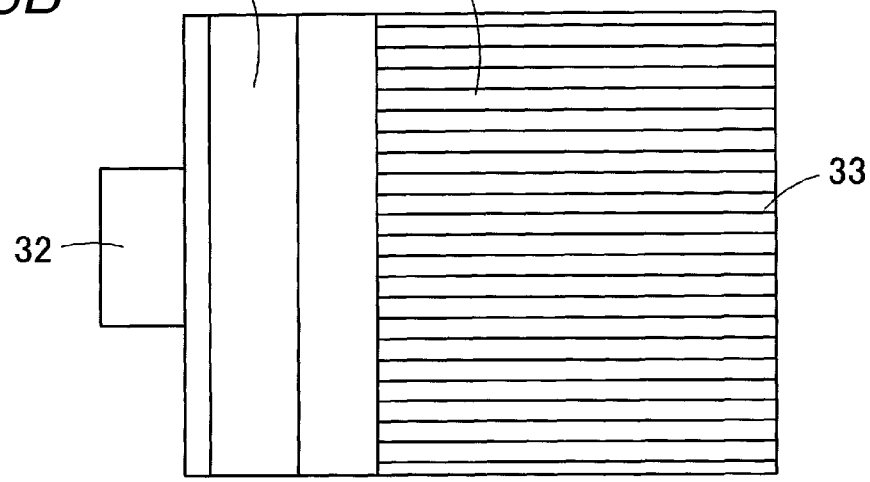
Figure 35C:
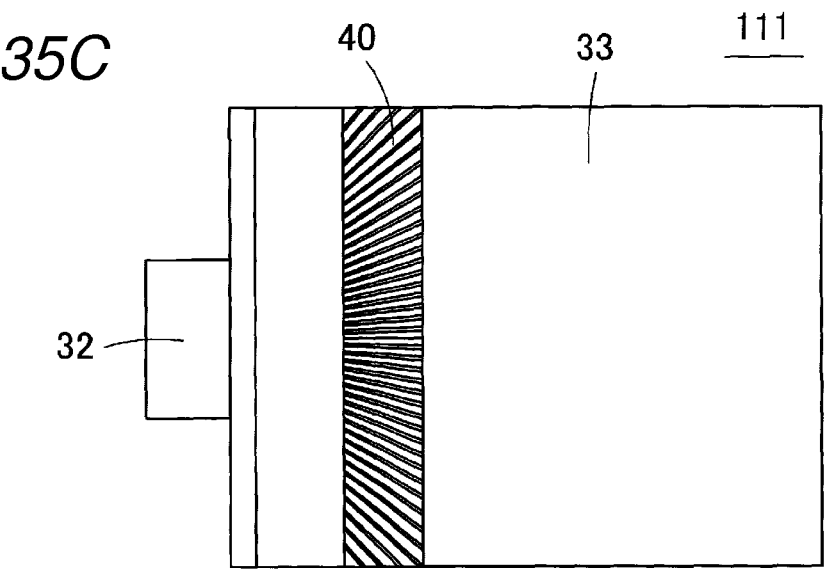

FIGS. 35A, 35B, and 35C are a side view, a plan view, and a bottom view illustrating a surface light source device 111 according to a seventh embodiment of the present invention. In the surface light source device 111, the lenticular lens 36 is provided in an effective lighting region in the upper surface of the light guide plate body 34, the end portion in the lower surface of the light guide plate body 34 is used as the pattern forming region 47, and the directivity conversion pattern 40 is provided in the end portion in the lower surface of the light guide plate body 34.

In the embodiments in FIGS. 3 to 34, similarly to the seventh embodiment, the directivity conversion pattern 40 may be provided in the surface on the side opposite from the light exit surface 39 of the light guide plate 33.

Eighth Embodiment

Figure 36:
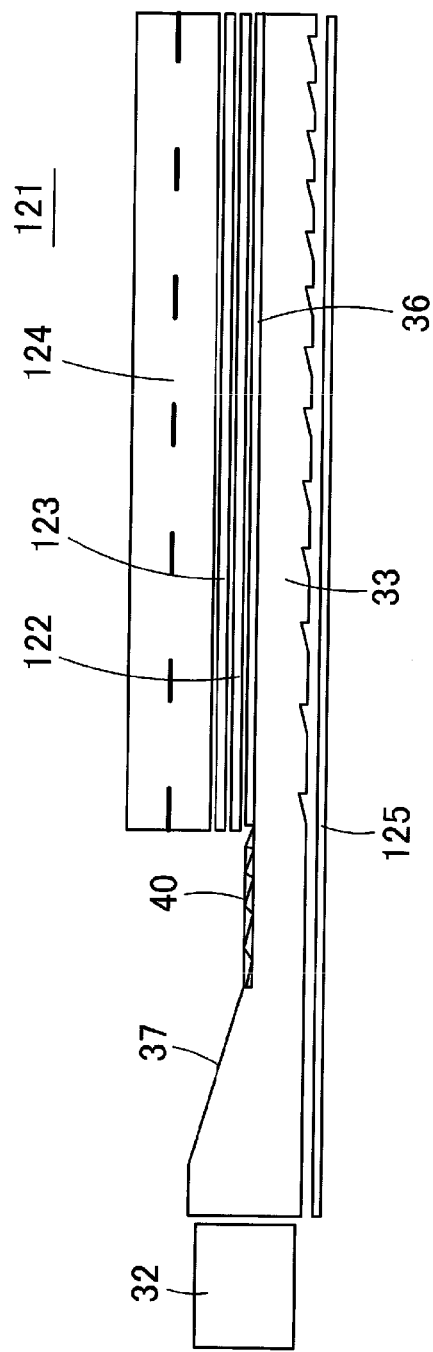
FIG. 36 is a sectional view illustrating a liquid crystal display device according to an eighth embodiment of the present invention.

FIG. 36 is a schematic sectional view illustrating a liquid crystal display device 121 in which the surface light source device (for example, the surface light source device 31 of the first embodiment) of the present invention is used. In the liquid crystal display device 121, a diffuser plate 122, a prism sheet 123, and a liquid crystal panel 124 are stacked while facing the light exit surface side of the light guide plate 33, and a reflecting sheet 125 is disposed on the rear surface side of the light guide plate 33. In the liquid crystal display device 121, the feature of the surface light source device of the present invention can be utilized, the light use efficiency of the liquid crystal display device 121 can be enhanced to facilitate visualization of the screen, and the low profile of the liquid crystal display device 121 can be achieved.

The invention claimed is:
1. A surface light source device comprising:
a light source; and
a light guide plate configured to introduce light emitted from the light source through a light incident surface to output the light to an outside through a light exit surface, wherein
the light source is provided at a position facing the light incident surface of the light guide plate, the light guide plate includes a light introduction part configured to trap the light that is emitted from the light source and incident through the light incident surface, and includes a light guide plate body that is provided so as to be continuously joined to the light introduction part, a thickness of the light guide plate body being smaller than a maximum thickness of the light introduction part, the trapped light being output to the outside through the light exit surface by a light exit part, the light introduction part includes an inclined surface in at least one of a surface on a light exit side of the light guide plate and an opposite surface thereof, the inclined surface being inclined from a surface in a portion having a thickness larger than the thickness of the light guide plate body toward an end of a surface of the light guide plate body, and the light guide plate body includes a directivity conversion pattern in a region located between the light introduction part and an effective lighting region of the light guide plate body in at least one of the surface on the light exit side of the light guide plate and the opposite surface thereof, the directivity conversion pattern converting a directivity direction of the light passing from the light introduction part to the effective lighting region such that an angle formed by the directivity direction of the light and a direction perpendicular to the light incident surface decreases when viewed from a direction perpendicular to the light exit surface.

2. The surface light source device according to claim 1, wherein the directivity conversion pattern includes a plurality of pattern elements, and when viewed from the direction perpendicular to the light exit surface, a distance from a virtual straight line perpendicular to the light incident surface to an end of at least one of the pattern elements on the effective lighting region side is larger than a distance from the virtual straight line to an end of the at least one the pattern elements on the light introduction part side, and the virtual straight line passes through an emission center of the light source.

3. The surface light source device according to claim 2, wherein, on both sides of the virtual straight line, an angle formed by the pattern element and the virtual straight line increases with increasing distance from the virtual straight line when viewed from the direction perpendicular to the light exit surface.

4. The surface light source device according to claim 2, wherein, on both sides of the virtual straight line, the pattern elements are arranged in parallel with each other when viewed from the direction perpendicular to the light exit surface.

5. The surface light source device according to claim 1, wherein the directivity conversion pattern in the region located between the light introduction part and the effective lighting region of the light guide plate body is partially removed to form a flat surface in proximity to a virtual straight line perpendicular to the light incident surface, and the virtual straight line passes through an emission center of the light source.

6. The surface light source device according to claim 1, wherein the directivity conversion pattern includes the plurality of pattern elements, and at least some of the pattern elements have asymmetric shapes in a cross section of the directivity conversion pattern parallel to the light incident surface.

7. The surface light source device according to claim 6, wherein the directivity conversion pattern is formed by alternately arranging slopes having inclined directions different from each other along a width direction of the light incident surface, in the cross section of the directivity conversion pattern parallel to the light incident surface, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that a sum of widths of slopes in each of which the normal line is inclined to an opposite side of the virtual straight line is larger than a sum of widths of slopes in each of which the normal line is inclined to the virtual straight line side, and the virtual straight line passes through an emission center of the light source.

8. The surface light source device according to claim 6, wherein the directivity conversion pattern is formed by alternately arranging slopes having inclined directions different from each other along a width direction of the light incident surface, in the cross section of the directivity conversion pattern parallel to the light incident surface, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that a ratio of a sum of widths of slopes in each of which the normal line is inclined to an opposite side of the virtual straight line to a sum of the sum of the widths of the slopes in each of which the normal line is inclined to the opposite side of the virtual straight line and a sum of widths of slopes in each of which the normal line is inclined to the virtual straight line side is greater than or equal to 0.2, and the virtual straight line passes through an emission center of the light source.

9. The surface light source device according to claim 6, wherein the directivity conversion pattern is formed by alternately arranging slopes having inclined directions different from each other along a width direction of the light incident surface, in the cross section of the directivity conversion pattern parallel to the light incident surface, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that an average angle of angles each of which is formed by the normal line belonging to the slope in which the normal line is inclined to the virtual straight line side and the direction perpendicular to the light exit surface is larger than an average angle of angles each of which is formed by the normal line belonging to the slope in which the normal line is inclined to an opposite side of the virtual straight line and the direction perpendicular to the light exit surface, and the virtual straight line passes through an emission center of the light source.

10. The surface light source device according to claim 6, wherein
the directivity conversion pattern is formed by alternately arranging slopes having inclined directions different from each other along a width direction of the light incident surface,
in the cross section of the directivity conversion pattern parallel to the light incident surface, assuming that a normal line is drawn outward from an inside of the light guide plate in each slope of the directivity conversion pattern in regions between which a virtual straight line perpendicular to the light incident surface is sandwiched, a cross sectional shape of the directivity conversion pattern is such that a ratio of an average angle of angles each of which is formed by the normal line belonging to the slope in which the normal line is inclined to an opposite side of the virtual straight line and the direction perpendicular to the light exit surface to a sum of the average angle of the angles each of which is formed by the normal line belonging to the slope in which the normal line is inclined to the opposite side of the virtual straight line and an average angle of angles each of which is formed by the normal line belonging to the slope in which the normal line is inclined to the virtual straight line side and the direction perpendicular to the light exit surface is greater than or equal to 0.25, and the virtual straight line passes through an emission center of the light source.

11. The surface light source device according to claim 1, wherein
the directivity conversion pattern includes a plurality of pattern elements,
and an average value of angles each of which is formed by an extending direction of the pattern element and an optical axis center ranges from 5° to 55° in regions on both sides of the optical axis center when viewed from the direction perpendicular to the light exit surface.

12. The surface light source device according to claim 1, wherein the directivity conversion pattern includes a plurality of pattern elements having V-groove shapes.

13. The surface light source device according to claim 12, wherein a vertex angle between the pattern elements adjacent to each other ranges from 50° to 140°.

14. The surface light source device according to claim 1, wherein a light diffusion pattern for spreading the light incident through the light incident surface in the width direction of the light guide plate is provided in the light introduction part.

15. The surface light source device according to claim 1, wherein the light exit surface is formed into a lenticular lens shape.

16. The surface light source device according to claim 1, wherein
a plurality of light sources, each identical to the light source, are disposed at intervals P in positions facing the light incident surface, and
the directivity conversion pattern exists in a region located less than or equal to a distance of $$P/[2 \cdot \arcsin(1/n)]$$

from an end surface on a light exit side of the light source, where n is a refractive index of the light guide plate.

17. A liquid crystal display device comprising:
the surface light source device according to claim 1; and
a liquid crystal panel.

\* \* \* \* \*